US008807891B2

(12) United States Patent
Clive-Smith

(10) Patent No.: US 8,807,891 B2
(45) Date of Patent: Aug. 19, 2014

(54) REMOVABLE FRAME SYSTEMS FOR VEHICLE SHIPPING

(76) Inventor: Martin Clive-Smith, Warwichshire (GB)

(*) Notice: Subject to any disclaimer, the term of this patent is extended or adjusted under 35 U.S.C. 154(b) by 0 days.

(21) Appl. No.: 13/816,193

(22) PCT Filed: Aug. 18, 2011

(86) PCT No.: PCT/GB2011/001229
§ 371 (c)(1),
(2), (4) Date: Feb. 8, 2013

(87) PCT Pub. No.: WO2012/022941
PCT Pub. Date: Feb. 23, 2012

(65) Prior Publication Data
US 2013/0136555 A1    May 30, 2013

(30) Foreign Application Priority Data

| Aug. 20, 2010 | (GB) | ................................... | 1013908.7 |
| Sep. 27, 2010 | (GB) | ................................... | 1016145.3 |
| Feb. 21, 2011 | (GB) | ................................... | 1102898.2 |
| Apr. 19, 2011 | (GB) | ................................... | 1106598.4 |
| Jun. 11, 2011 | (GB) | ................................... | 1109779.7 |

(51) Int. Cl.
*B60P 3/08* (2006.01)

(52) U.S. Cl.
USPC .......................................................... 410/8

(58) Field of Classification Search
CPC .................................... B60P 3/08; B60P 7/06
USPC ............. 410/3, 4, 7, 8, 13–18, 24, 26, 27, 29, 410/29.1
See application file for complete search history.

(56) References Cited

U.S. PATENT DOCUMENTS

| 5,286,149 A | 2/1994 | Seay et al. |
| 5,775,858 A | 7/1998 | Bacon |

FOREIGN PATENT DOCUMENTS

| GB | 1252025 | 11/1971 |
| JP | H0238345 | 3/1990 |
| WO | 9421488 | 9/1994 |
| WO | 0228748 | 4/2002 |
| WO | 2006032871 | 3/2006 |

OTHER PUBLICATIONS

International Search Report and Written Opinion dated Dec. 23, 2011 for related PCT Application No. PCT/GB/2011/001229.

*Primary Examiner* — H Gutman
(74) *Attorney, Agent, or Firm* — Troutman Sanders LLP; Ryan A. Schneider; Christopher Glass

(57) ABSTRACT

A frame system for supporting two wheels of an associated vehicle for transport within an existing transportable structure such as a standard ISO container which has longitudinally extending side structures 5, 6. The frame system comprising a transverse wheel supporting frame 41, 43 supported by two vertical posts 40, 42 located one at each end of the wheel supporting frame. Each post is provided with attachment means 44, 48a for securing the top and bottom of the post at a plurality of locations along the length of the associated side structure independent of the shape of the side structure. The wheel supporting frame 41, 43 is raiseable with or without a vehicle loaded thereon and once raised is fixable 49, 50, 51 to the posts 40, 42 at a chosen location for transport within the transportable structure. The attachment means may comprise ties 44 of adjustable length which pull each post in the fore and aft direction relative to the side structure 5, 6 to locate each post.

31 Claims, 19 Drawing Sheets

REMOVABLE FRAME SYSTEMS FOR VEHICLE SHIPPING

CROSS-REFERENCE TO RELATED APPLICATIONS

This application is a US National Stage of International Application No. PCT/GB2011/001229, filed 18 Aug. 2011, which claims the benefit of GB 1109779.7, filed 11 Jun. 2011, GB 1106598.4, filed 19 Apr. 2011, GB 1102898.2, filed 21 Feb. 2011, GB 1016145.3, filed 27 Sep. 2010, and GB 1013908.7, filed 20 Aug. 2010, all herein fully incorporated by reference.

FIELD OF THE INVENTION

This invention relates to frames systems for use in freight containers to allow vehicles to be raised above the floor of the container to allow other vehicles to be transported below.

BACKGROUND OF THE INVENTION

It is known to provide such frame systems but with ever increasing freight costs there is a need to pack ever more vehicles efficiently into such containers There are several types of frame system available, some installed permanently in the container, some removable needing heavy plant to pull the frames in and out, others with crane like frames to lifting and positioning the vehicles using electric motors and so on.

BRIEF SUMMARY OF THE INVENTION

There is a need for a frame system which is compact and light weight so as to minimise the volume within the container occupied by the frame system and to allow the system to be easily installable and removeable from the container so that the container can be used to transport other goods on its return journey. The frame system must also be capable of holding the vehicle securely in its raised transport position and resisting the high longitudinal accelerations which it will experience during shipping, transport and handling and in particular railway shunting of the container. On the railways, old rolling stock has worn and very hard buffers such that when one wagon encounters another, up to 4 g longitudinal acceleration can be felt by a container. There is also a requirement for the frame system to be able to allow on the spot small adjustments of the position of the vehicle within the container to accommodate close proximity of adjacent vehicles.

It is an object of the present invention to provide an improved frame system which addresses the above needs.

Thus according to the present invention there is provided a frame system for supporting two wheels of an associated vehicle for transport within an existing transportable structure having longitudinally extending side structures, the frame system comprising a transverse wheel supporting frame supported by two vertical posts located one at each end of the wheel supporting frame, each post being provided with attachment means for securing the top and bottom of the post at a plurality of locations along the length of the associated side structure independent of the shape of the side structure, the wheel supporting frame being raiseable with or without a vehicle loaded thereon and once raised being fixable to the posts at a chosen location for transport within the transportable structure.

Preferably the attachment means engages standard fastening structures provided on the longitudinally extending side structures of the transportable structure.

Conveniently the transportable structure is a standard ISO container with standard fastening hoops attached to top and/or bottom side rails of the container.

In one embodiment the attachment means comprises ties of adjustable length which pull each post in the fore and aft direction relative to the side structure to locate each post.

The ties may also pull each post towards the adjacent side of the structure. Conveniently each tie is flexible and ratchet winch means are associated with each post for tensioning the flexible tension ties. Each flexible tie may pass through or around a guide member on the associated post which is spaced from the adjacent side of the structure to provide a pull force towards the adjacent side.

Using the above flexible tie arrangement which engages the standard fastening hoops secured to the upper and lower side rails of the container allows the position of the posts to be adjusted as required along the length of the container since the posts do not require any engagement with the sides of the container other than through the hoops to locate the posts against longitudinal movement. In particular the posts do not engage the corrugations of the side walls of the standard ISO container for longitudinal location so that this frame system can be used in containers with no rigid sides or containers which are completely open or fitted with flexible side curtains. This ability to adjust the position of the posts along the container, in a manner which is independent of the shape of the sides of the container, gives maximum flexibility in accommodating vehicles of different sizes.

It is also possible to make small adjustments to the position of the posts even when a vehicle is loaded on the wheel support frames to vary the clearance between the vehicles in the container. This can be achieved by releasing and tensioning the ties on either side of the posts as required.

In a further variant the ties are rigid ties such as adjustable turnbuckles.

Each vertical post may be attached by ties at both the top and bottom. Alternatively, or additionally, the bottom of each vertical post may be provided with a fixing plate having holes through which screws or nails or similar fixings can be driven to attach the bottom of the post to a floor of the transportable structure.

The wheel supporting frame may be adjustable relative to each vertical post for rotation about a generally transverse axis when in its transporting position.

The present invention also provides a frame system for supporting two wheels of an associated vehicle for transport within an existing transportable structure having longitudinally extending side structures, the frame system comprising a transverse wheel supporting frame supported by two vertical posts located one at each end of the wheel supporting frame, the wheel supporting frame being raiseable relative to the posts and once raised being adjustable longitudinally and/or rotationally relative to the posts and fixable to the posts at a chosen position for transport within the transportable structure. This adjustability of the wheel support frames relative to the posts is useable in a wide range of frame systems.

Each end of the wheel supporting frame may be provided with an end plate which slides up and down an inwardly facing surface on the adjacent vertical posts as it is raised and lowered, the end plates include a fastening means by which the position of the frame can be adjusted for rotation and/or horizontal displacement relative to the posts. The end plate fastening means may also fastens each end plate against transverse displacement relative to the posts.

The end plates may each including an array of bolt holes which can be aligned with bolt holes in the cooperating inwardly facing surface on the adjacent vertical post so that the frame can be fastened in a chosen position by inserting bolts through the aligned holes.

When the wheel support frame is pinned to its associated vertical post by a single bolt, the wheel frame can be rotated relative to the posts by raising or lowering the wheel support frame so that the support frame is rotated about the single bolt to adjust clearance between the wheel support frame and a vehicle below the support frame, another bolt being inserted through aligned bolt holes in each end plate and the associated post when the desired rotational position of the wheel support frame has been obtained.

The width of the wheel support frame may be adjustable to fit into a wider transportable structure whilst still using the same vertical posts.

A hoist may be used to raise and lower the wheel supporting frame relative to its associated vertical post.

For example, a hoist may be mounted at the top of each post and the associated wheel support frame may be suspended from the hoist by a lift chain or wire which hangs down substantially vertically from each hoist thus allowing a vehicle supported on the wheel support frame to be displaced horizontally relative to the posts with minimal horizontal force. Typically, an 1800 kg car can be displaced longitudinally by a horizontal force of 100 kg and the wheel support frames can be swung longitudinally typically +/−150 mm relative to their associated posts before fixing through aligned holes to the posts. This is particularly useful where posts for any reason, such as sidewall damage or geometry, cannot be as close to the wheel centres as is ideal.

The hoists may be mounted within a recess in the top of the posts so that the lift chains or wires hang close to the neutral axis of the post sections to reduce bending inwards of the posts during lifting of the wheel support frames.

The hoist may be a manual chain hoist with its hand chain moved by a chain wheel driven by a hand held electric drill.

The chain wheel of each hoist may be supported from an arm carried by the associated post.

The effective length of the arm is adjustable to enable the chain tension of the chain hoist to be maintained.

The end portions of a wheel supporting frame may comprise two transversely extending beams between which wheels of different diameter can be supported.

Moveable spacers are fitted over the transverse beams to support wheels of different diameters and control the amount by which the wheels penetrate between the beams.

A wheel support frame may comprise a pair of transversely spaced wheel support plates cantilevered towards the body of the vehicle from a transverse beam, the plates being of a size sufficient to support the locus of the foot prints of vehicle wheels to be carried on the wheel support frame.

Ramps can be attached to the wheel support frame for loading a vehicle onto the wheel support frame in a raised position.

The ramps may be pinned to the forward positioned wheel support frame and located underneath the rearmost wheel support frame, the rear most frame resting upon the ramp during vehicle loading, the rear most frame then being liftable clear of the ramp, optionally and temporarily taking part of the vehicle outside of the transportable structure, taking the vehicle wheels up with it to allow the now unladen ramp to be disconnected from the forward positioned wheel support frame and removed from the transportable structure.

The frame system employs four posts and two associated wheel support frames to support the front and rear wheels of a raised vehicle within the transportable structure.

Involuntary rotation of one or both the wheels frames about a wheel axle may be restrained by a removable beam attached between the two wheel support frames.

The vertical posts are channel-shaped and can be paired up and coupled together to form a secure box for the transport of loose fittings such as the ties and fixing bolts and nuts when not in use.

The posts when paired can be set to a paired length which suits the space available within a transportable structure for storage or transport to another location.

The wheel support frames are designed so that two wheel support frames when not in use can be nested and/or stacked one upon another and/or pinned together in pairs for further stacking one pair upon another during storage or transportation to another location.

The wheel frames when stacked on their sides present a horizontal tunnel designed to be picked up with a fork lift truck individually or in bundles.

More than half of the life of a vehicle lifting frame system is spent in transport back to base to collect more vehicles, and/or in storage awaiting cargo. Containers are used to transport the frames back to base. This transport has a cost and some frames occupy 10 to a 40 ft container. The present invention however can achieve something more than 88 frames to a 40 ft container thus minimising the operational cost of the empty movement. Also a container with the frame system of the present invention removed is a normal container which can be used to transport any cargo on its return journey.

In a second embodiment of the present invention the fastening means comprises a pin with a hooked end, the pin being insertable through a selected one of a series of holes connected with the post and the hooked end of the pin being engageable with standard fastening hoops attached to top and/or bottom side rails of the container.

In such an arrangement, each post has a generally longitudinally extending support rail connected therewith in which the series of holes are formed.

Each post and associated support rail may be braced by diagonal stays to form a triangular structure for the support of each end of the wheel support frame.

The support rails may be located adjacent the bottom side rails of the transportable structure with the hooked pins engaging the fastening hops associated with the bottom side rails.

Alternatively, the support rails may be located adjacent the top side rails of the transportable structure with the hooked pins engaging the fastening hoops associated with the top side rails and the other ends of the post resting on a floor of the structure.

BRIEF DESCRIPTION OF THE FIGURES

The present invention will now be described, by way of example only, with reference to the accompanying drawings in which: —

DETAILED DESCRIPTION OF PREFERRED EMBODIMENTS

Figure 1:
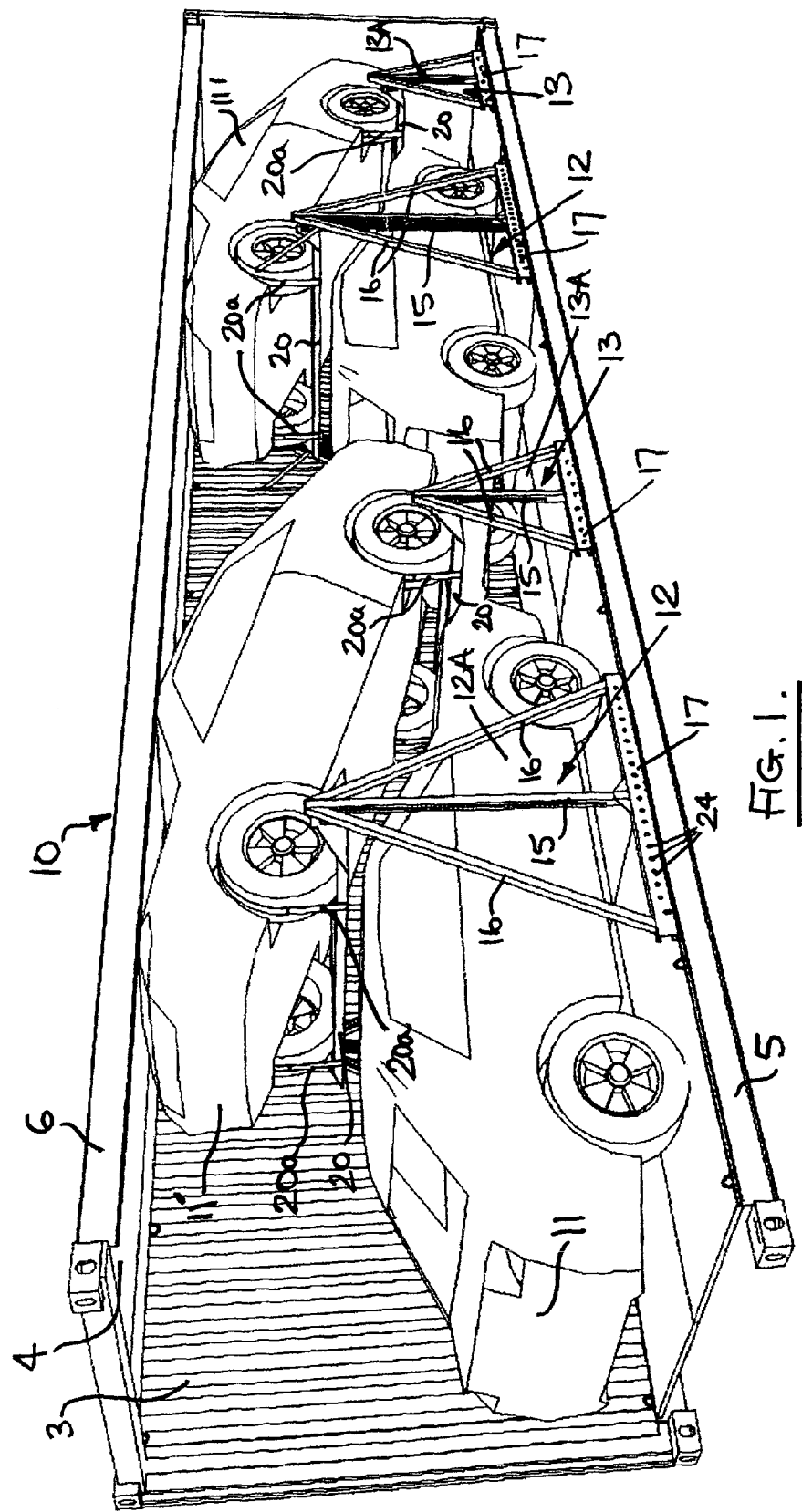
FIG. 1 shows a perspective view of a standard ISO container with one side removed in which a first form of frame system in accordance with the present invention is in use.
Figure 2:
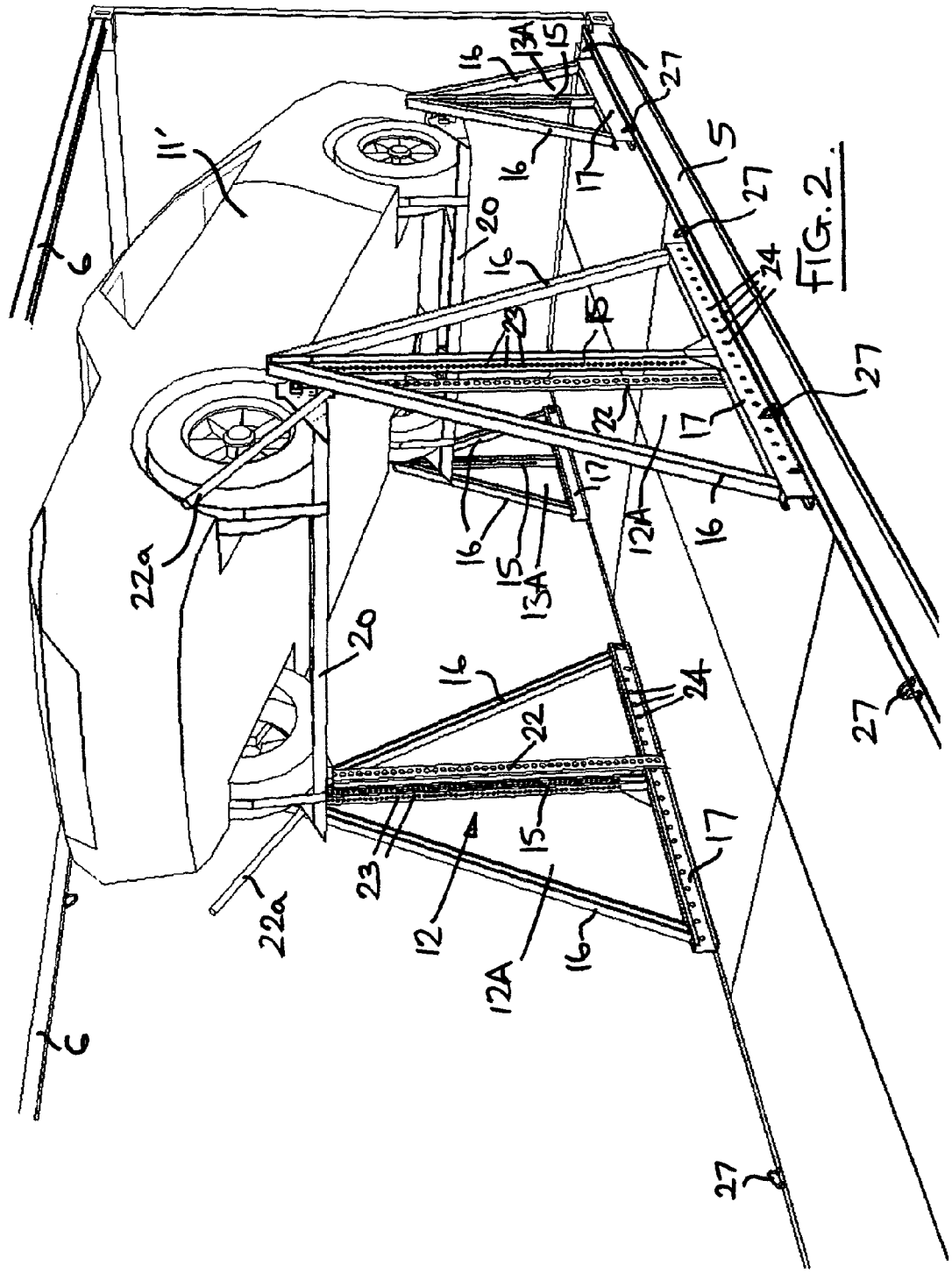
FIG. 2 shows part of the frame system of FIG. 1 on a larger scale.

Referring to the drawings, FIG. 1 shows a standard ISO container 10, with corrugated sides 3 and a roof 4 supported by side rails 5 and 6. One side 3 is removed in FIG. 1 to reveal a number of vehicles in the form of cars 11 stored for transportation. Upper cars 11' are supported on front and rear support frames systems 12 and 13 and the lower cars 11" rest on the floor 14 of the container.

FIGS. 2 to 6 show details of the support frames systems 12 and 13 in more detail. Each front wheel support frame system 12 comprises a vertical post 15 supported by diagonal stays 16 from a long base rail 17 to provide a triangular end frame structure 12A. Each post 15 is channel sectioned and has inwardly turned flanges 18 within which a stub post 19 slides which is connected with an adjacent end of a transversely extending wheel support frame 20 which completes the system. Each stub post 19 also has a downwardly facing hook 21 via which the wheel support frame 20 can be connected to a screw jack or tractor jack 22 (operated by lever 22a) mounted within each post 15 so that the wheel support frame 20 can be raised and lowered relative to the posts 15. The posts 15 also include holes 23 through which locating pins can be inserted to hold the stub posts 19 and thus the wheel support frame 20 at a particular height during transportation of the cars. The wheels of the vehicle are lashed to the wheel support frames 20 by lashings 20a.

Figure 3:
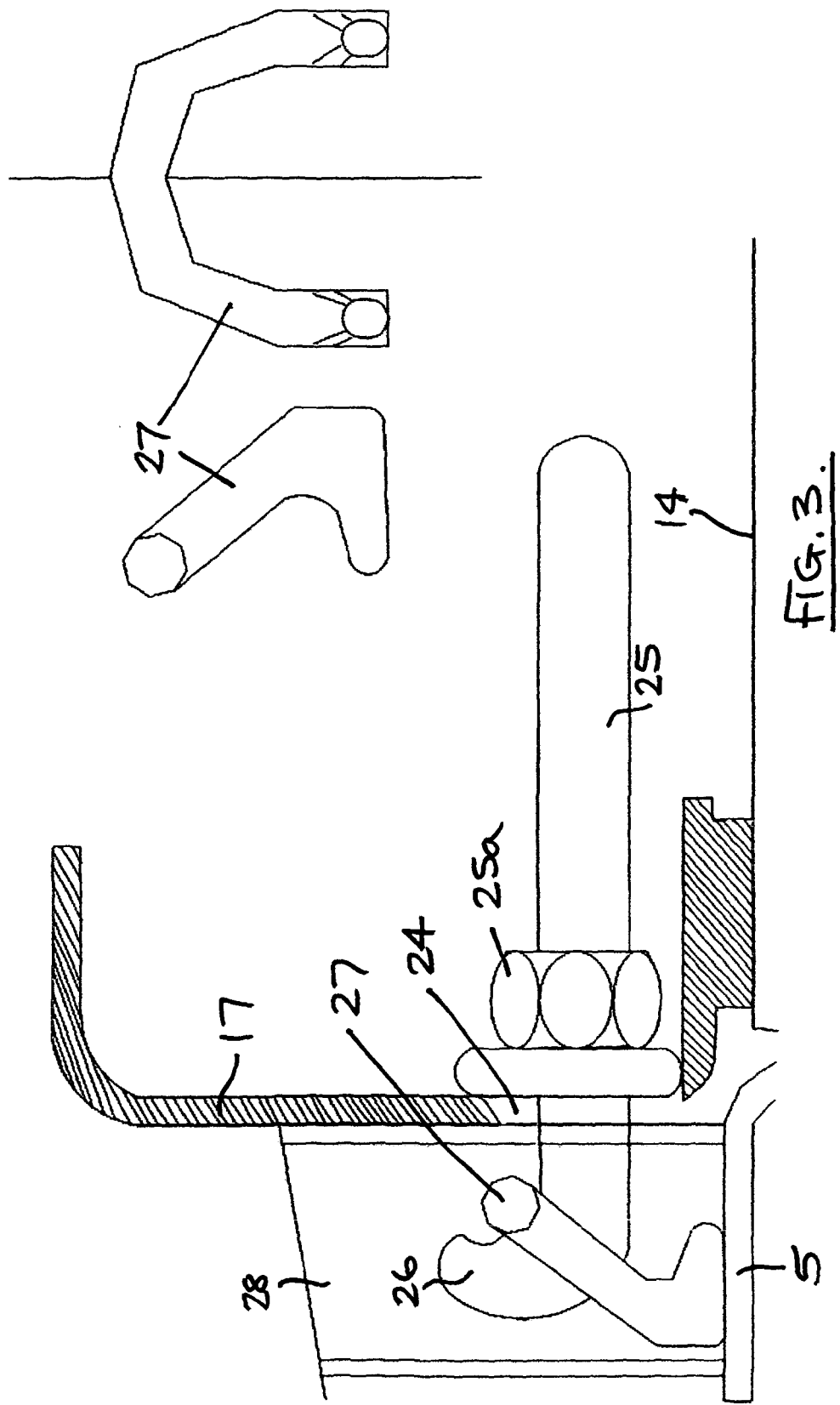
FIG. 3 shows a fastening means used to secure the frame system of FIGS. 1 and 2 to the container side rails.

The end frames 12A are secured to the container using the pin arrangement shown in FIG. 3. The base rail 17 of end frame 12A is provided with a series of longitudinally spaced holes 24 through which pins 25 extend. Pins 25 have fastening hooks 26 at their ends which can engage lashing hoops 27 which are secured to the bottom rails 5 of the container in the valleys 28 of the corrugated sides of the container. The side wall corrugations commonly have a pitch of 278 mm so the hoops 27 are pitched at multiples of the corrugation pitch. In this example, the spacing between holes 24 would conveniently be 27.8 mm to provide good longitudinal adjustment which is independent of the shape of the side walls of the container since the base rails 17 do not enter the corrugations of the container side walls 3 and thus the ability to secure the base rails at particular locations is totally dependent on the spacing of the holes 24 and hoops 27. As can be seen from FIG. 3, after the hooks 26 have been inserted through hoops 27 the pins 25 are rotated so that the hooks fasten the base rails 17 to the hoops 27 and the pins are locked in position by a threaded nut 25a or some other cam wedge or lock which pulls the rail 17 towards the sidewall 3 or bottom rail 5 of the container 10.

The vertical posts 15 may also be arranged to abut the underside of the top side rail 6.

In an alternative arrangement, the end frames 12A can be installed upside down relative to the frames shown in FIGS. 1 to 6 with the base rails 17 secured to hoops 27 fastened to the top rails 6 and located in the tops of the side wall corrugations. In this arrangement, the other ends of the vertical posts 15 rest on the floor of the container. In this upside down arrangement an additional long rail 17 may be provided which is connected with the end of the vertical posts which is resting on the floor of the container so that the frame is connected to hoops at the top and bottom of the container.

The end frames 12A are able to flex sideways away from each other to rest upon the side wall 3 (if any) of a container for transverse support. There is no transverse strut to keep them apart the strutting being provided by the wheel support frame 20.

It is an important feature of the present invention that, apart from the wheel support frame 20 no component extends transversely between the end frames 12A. This significantly improves the ability of the present invention to closely pack cars within the container.

Figure 4:
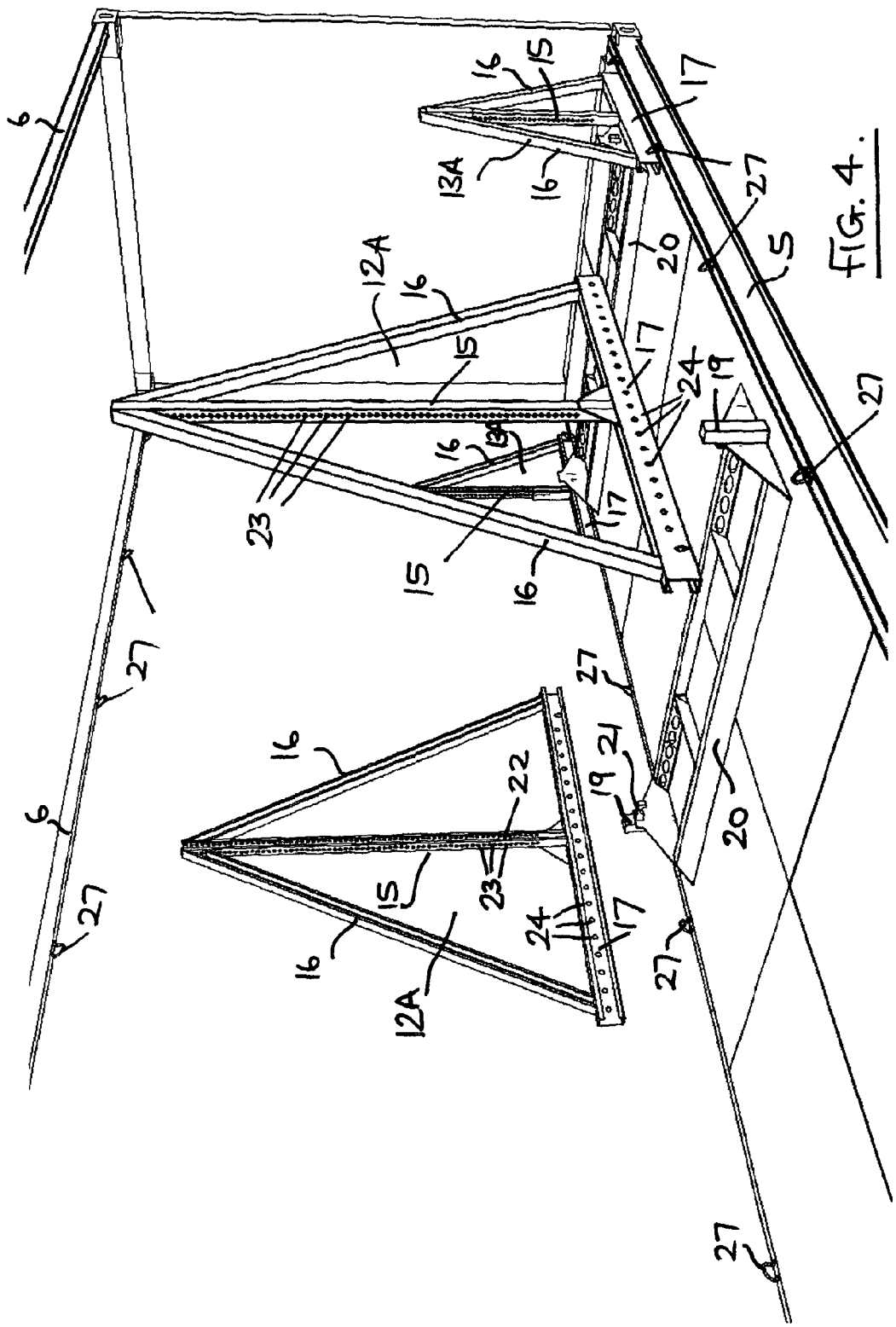
FIG. 4 shows part of the installation process of the frame system shown in FIG. 2.

The end frames 12A are assembled to their wheel support frames, as shown in FIG. 4, by placing the wheel support frame on the base of the container and then man handling the bottom ends of the channel section posts 15 over the stub posts 19. The hooked pins 25 are then connected with the hoops appropriate 27. The height of the stub posts 19 and tightness of fit within posts 15 can be selectively chosen for fit and operation.

The wheel support frames 20 may include transverse adjustment so as to push the posts 15 and or diagonals 16 directly or via the stub posts 19 against the side wall of the containers.

The adjustment may comprise a wedge to be tapped in between stub post 19 and section channel section post 15.

The smaller rear wheel support frame system 13 is similar in construction and is similarly assembled to the front wheel support frame system 12 described above. Each frame system 13 has two end frames 13A with a wheel support frame 20 extending therebetween and thus similar components in frames systems 13 have been similarly numbered to the corresponding components of frame systems 12.

Once a car is lashed by webbing strap 28 to the wheel support frames 20 the car is fully restrained against the accelerations acting on the car during transportation due to typical rail shunting, rolling seas and crane impact on the container via the pinning of the end frames 12A and 13A to the hoops 27 both in a vertical and longitudinal direction. The base rails 17 control rotation of the end frames 12A and 13A in a vertical plane during transport and shunting loads.

As will be appreciated, the wheel support frame may be raised and lowered by any suitable means in place of the screw or tractor jacks 22. For example, manual or electric winches can be used, hoists, fork lift trucks and special lifting machines can be used.

In an alternative construction, the rails 17 of the end frames 12A and 13A may be interconnected and they may be arranged to slide in a telescopic manner one inside the other for length adjustment to match cars with longer or shorter wheel bases.

Figure 5:
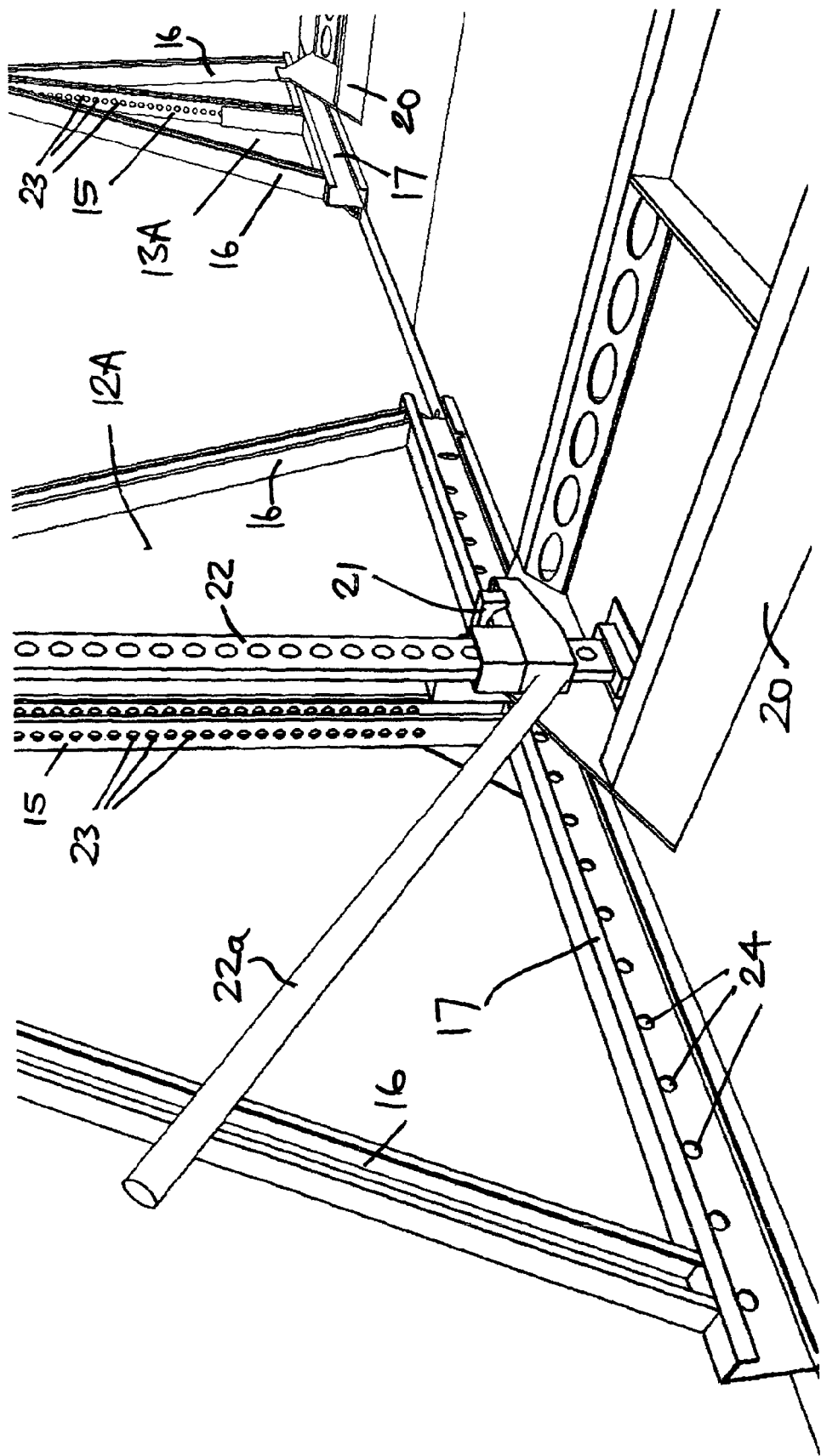
FIG. 5 shows more details of the jacking arrangement used in the frame system of FIGS. 1 and 2.
Figure 6:
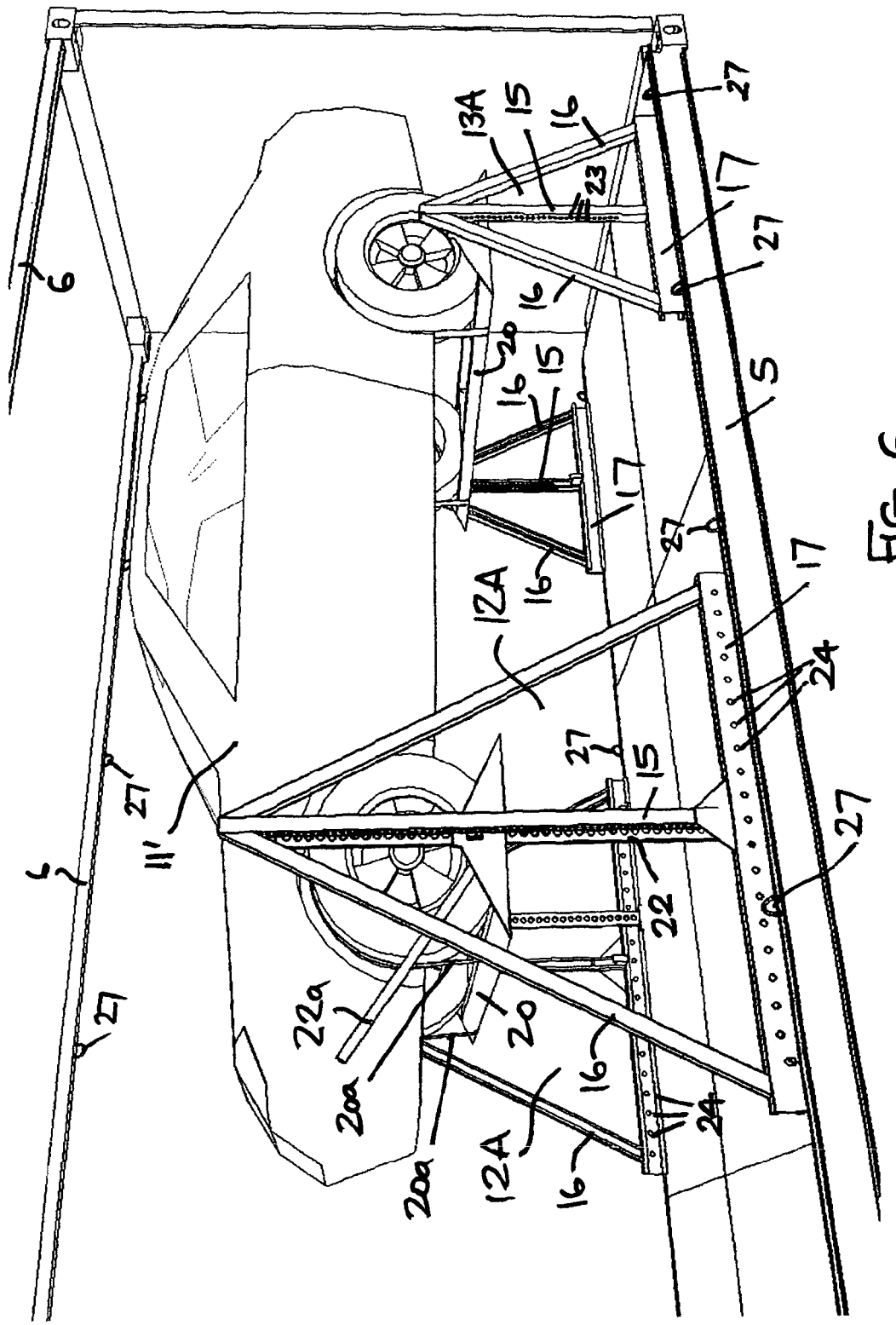
FIG. 6 shows a vehicle in a partly raised position on the frame system shown in FIG. 2.

As will be appreciated, with reference to FIG. 6, if the rear wheels of a car are supported from the smaller frame system 13 and are raised to its transport height with the wheels lashed to wheel support frame 20, then as the front wheel support frame 20 is raised vertically it will be seen that as the car reaches the substantially horizontal position shown in FIG. 6 that the distance between the wheel support frames 20 is at its shortest and, as the car rises to its upper transport position, the front wheels will tend to roll relative to the front wheel support frame 20 on to edge portion 20b of frame 20 (see FIG. 5). Alternatively, the front wheels may be lashed to their wheel support frame and the rear wheels may roll as the front wheel support frame is raised or lowered. To aid the rolling of the wheels, the support frame can be made as frame 43 with its cantilevered plate as described below.

Figure 7:
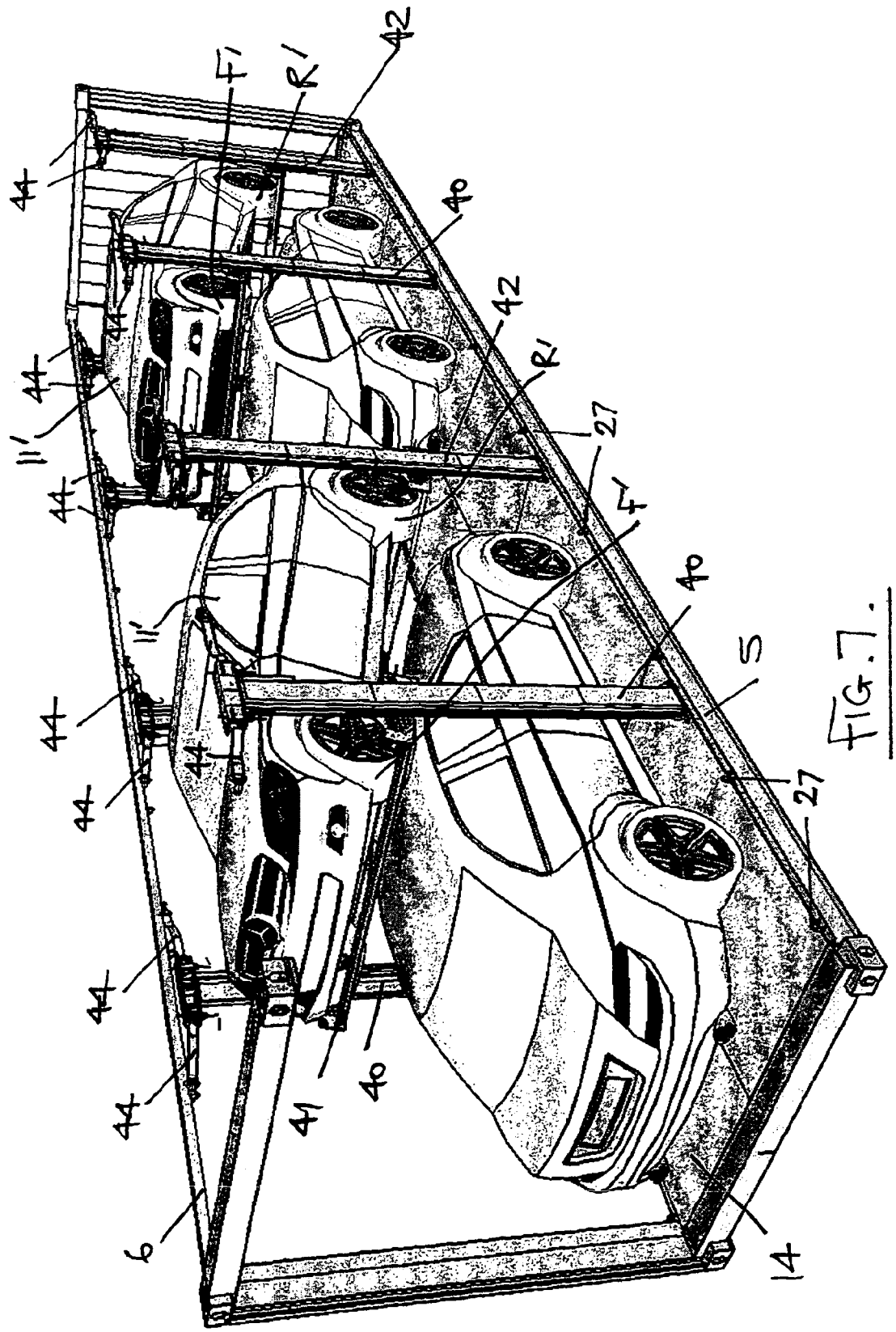
FIG. 7 shows a perspective view of a standard ISO container with one side and the roof removed in which a second form of frame system in accordance with the present invention is installed.
Figure 8:
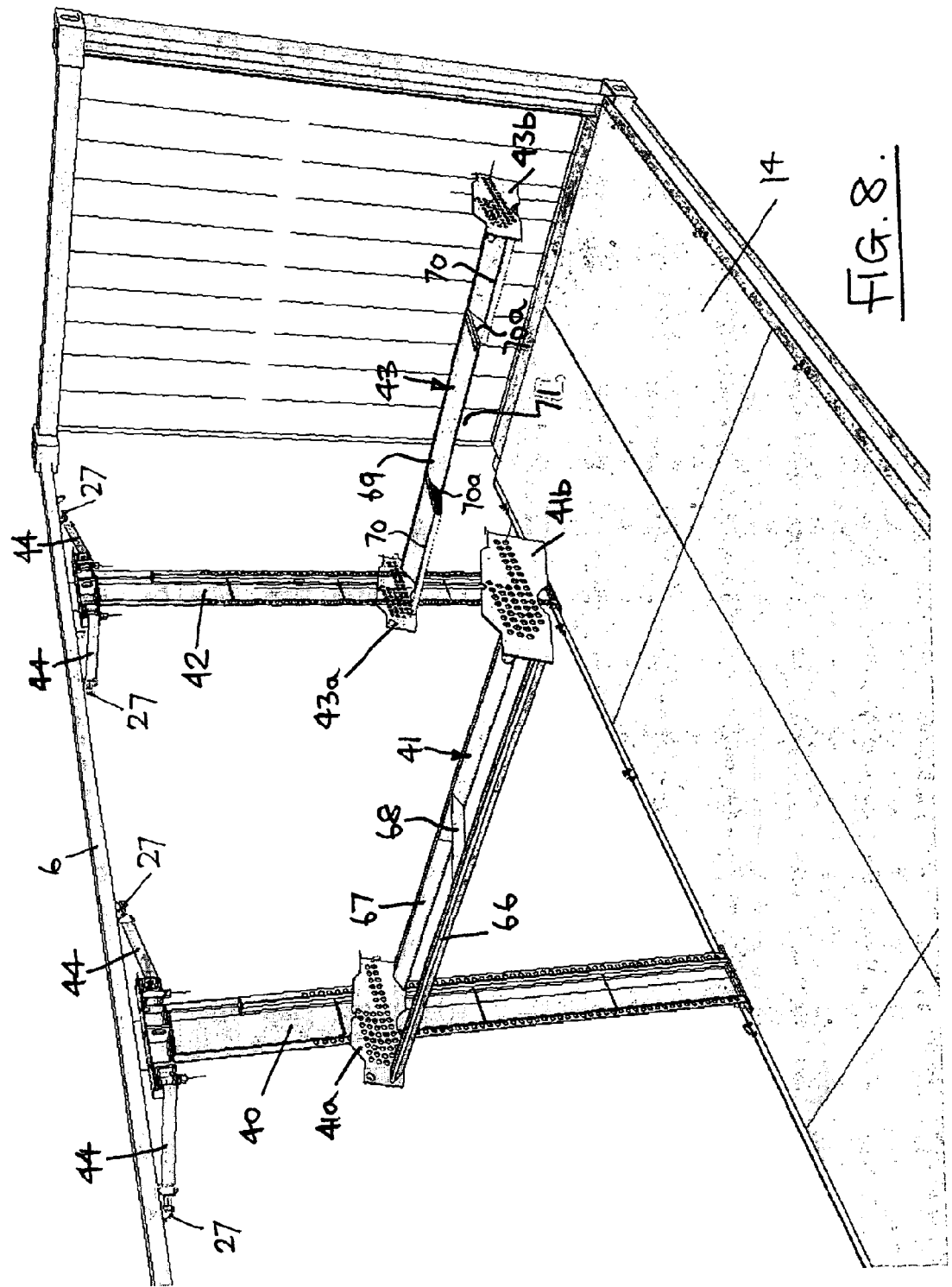
FIG. 8 shows part of the system of FIG. 7 on a larger scale.
Figure 9:
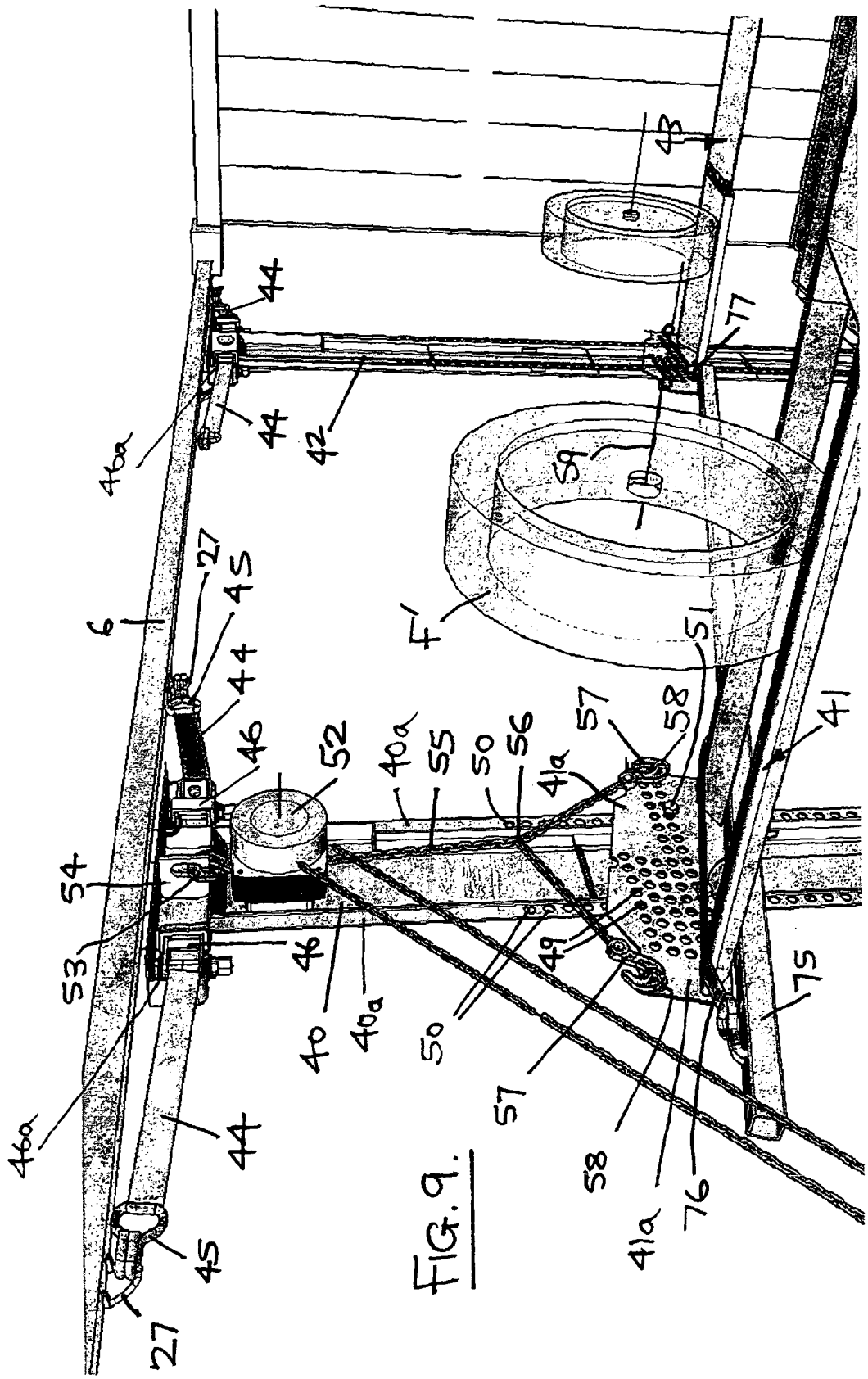
FIG. 9 shows a hoist arrangement used in the system of FIGS. 7 and 8.
Figure 10:
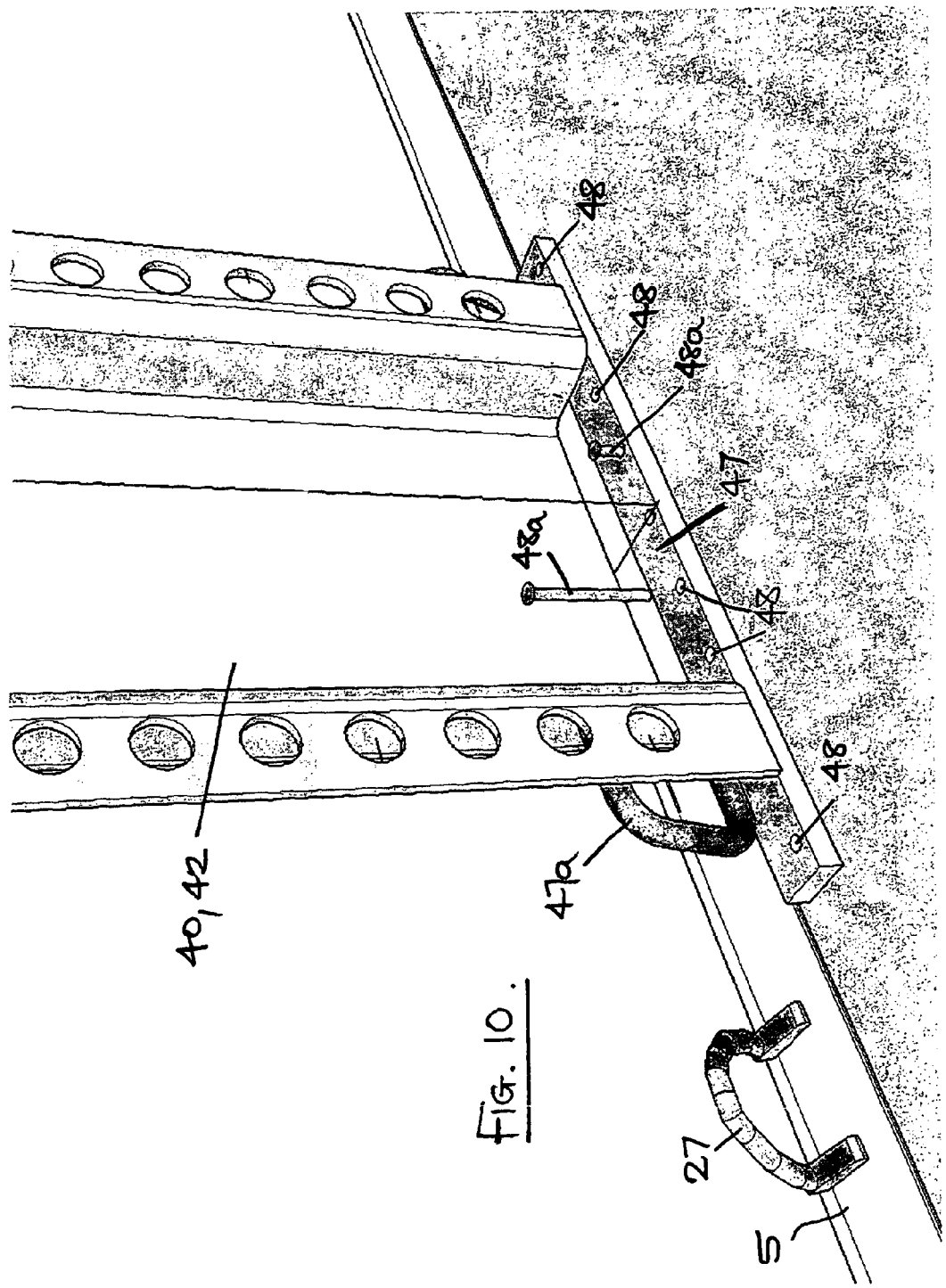
FIG. 10 shows a lower post fastening plate arrangement used in the present invention.
Figure 11:
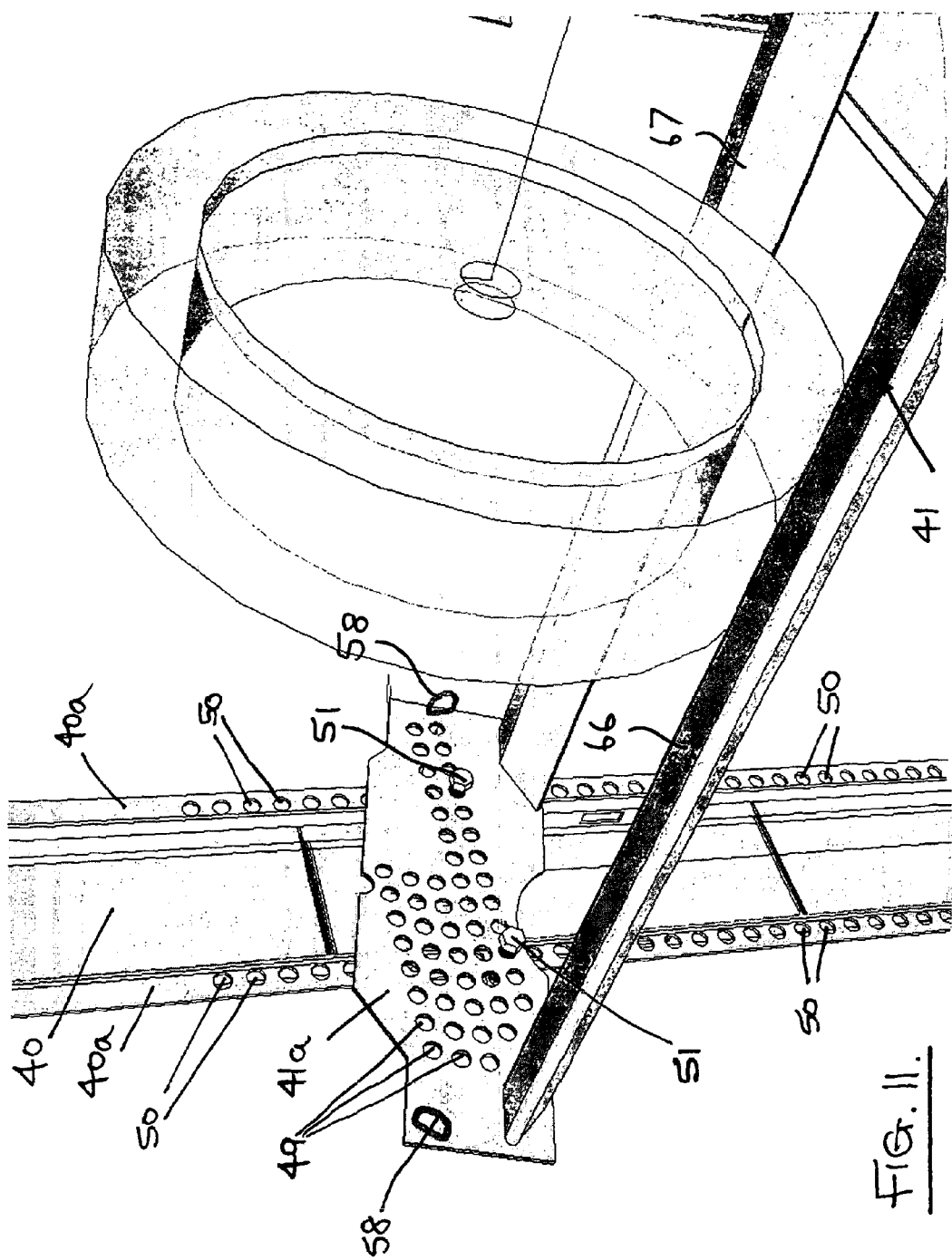
FIGS. 11 and 12 show details of the end plates used on front and rear wheel support frames used in the present invention.
Figure 12:
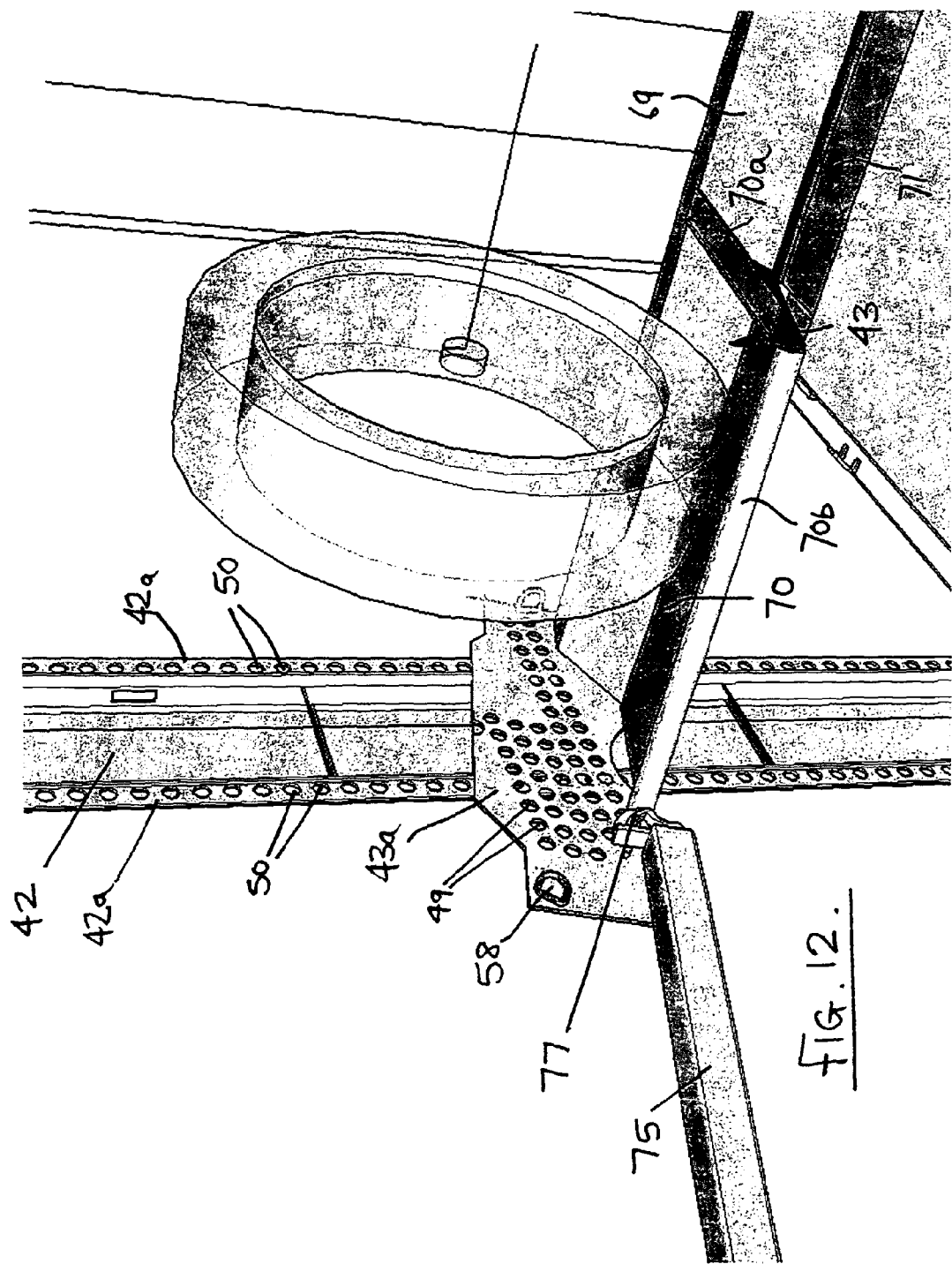

In another embodiment of the invention, shown in FIGS. 7 to 19 the front set of wheels F' of the upper cars 11' are each supported from a frame system which comprises a pair of vertically extending posts 40 between which a transversely extending front wheel support frame 41 extends. Similarly, the rear set of wheels R' of the upper cars 11' are each supported from a frame system which comprises a pair of vertically extending posts 42 between which a transversely extending rear wheel support frame 43 extends. The front and rear wheel support posts 40 and 42 are identical. Each post is secured to the container using flexible ties 44 (e.g. of webbing) which have hooks 45 for engagement with securing hoops 27 secured to the underside of the top side rails 6 of the container. The other ends of ties 44 are engaged by ratchet winches 46 so that the posts can be braced relative to the container in the fore and aft directions by tensioning ties 44 as shown in FIGS. 7 to 9. The ties 44 when tensioned pass over guide shoulders 46a and tend to pull the posts outwardly towards the sides of the container thus further stabilising the posts.

The bottom end of each post 40, 42 is provided with a fixing plate 47 (see FIG. 10) having holes 48 through which nails or screws 48a can be driven into the standard plywood floor lining 14 of the container to further locate the post. Alternatively or additionally flexible ties or lashings or rigid turnbuckles (not shown) can be used between lashing hoops 47a carried by plates 47 and the fastening hoops 27 mounted on bottom rails 5 to locate the bottom ends of the posts.

Each wheel support frame 41 and 43 has end plates 41a, 41b and 43a and 43b respectively. These end plates have arrays of holes 49 which can be used to secure the end plates to the posts using bolts 51 (and associated nuts not shown) extending through holes 50 in outwardly turned flanges 40a and 42a on posts 40 and 42 (see FIG. 11) when the cars are in their transport positions. These end plates slide easily and with a small clearance vertically, longitudinally and rotationally over flanges 40a and 42a so that the final transport positions of the wheel support frames 41 and 43 relative to the posts 40 and 42 can easily be adjusted when the cars have been raised to the transport height.

The wheels are secured to the wheel support frames by webbing straps and ratchets (not shown but similar to lashings 20a shown above) which lash the wheels to the wheel support frames. The longitudinal accelerations acting on the cars thus pass through the axles of the cars which in turn try to rotate the wheel frames, now held by the bolts 51.

The wheel support frames 41 and 43 can be raised and lowered relative to the posts 40 and 42 by chain hoists 52 which have hooks 53 which engage eye plates 54. Hoists 52 are partly recessed within posts 40 and 42 to keep the lifting chains 55 close to the neutral axes of the posts to minimise bending of the posts. The lifting chains 55 divide at 56 to provide a two point lift using hooks 57 which engage rings 58 screwed to the end plates. This provides a stable lifting arrangement as the chain divide at 56 is above the rotation axis 59 of the wheel F' on the associated wheel support frame.

The posts 40, 42 are located so that their vertical centre lines are aligned within about 100 mm short of the axis of the car wheel axles. Thus the chains 55 hang down close to the vertical when the car is on the floor and as it is lifted and tilted to its transport angle of say 20 degrees, the chain 55 remains close to the vertical.

So, as will be appreciated, since the wheel support frames 41 and 43 hang from the closely vertical chains 55 they can be swung longitudinally typically +/−150 mm relative to their associated post 40, 42 on their flanges 40a, 42a so that a car supported from the associated wheel frames can be displaced longitudinally by the swinging movement of the chains 55 prior to the insertion of bolts 51. Typically an 1800 kg car can be displaced longitudinally by a horizontal force of 100 kg. The end plates can also be rotated relative to their associated posts to optimise clearance between the cars and the frame system components. This rotation can be easily achieved by inserting one bolt 51 in each end plate through aligned holes 49 and 50 and then raising or lowering the wheel frame so that it rotates about the inserted bolt 51 until another appropriate pair of holes 49 and 50 are aligned for the insertion of a second bolt 51. The same procedure is carried out simultaneously on both ends of each wheel support frame. Thus the wheel support frame is now secured very firmly to the posts for motion in all directions ready for transport and handling.

When a car is raised and tilted for transport typically 20 degrees, the horizontal distance between the wheels reduces. The horizontal distance of a car with a wheel base of 3 m will reduce by about 180 mm at 20 degrees. Thus with the posts now firmly located in place to enable safe lifting of the car, the fixing of the wheel frames to the posts allows for relative displacement of frame to post at each end of the wheel frame as well as from front wheel frame to rear wheel frame. Furthermore, if the wheel frames are to be allowed to rotate about a transverse axis, further adjustment still is required.

It will be appreciated that this ability of the wheel support frames to be adjusted both longitudinally and rotationally relative to the posts is an independent inventive concept which is useable in frame systems which do not necessarily use the ties 44 to secure the posts to the container.

Figure 13:
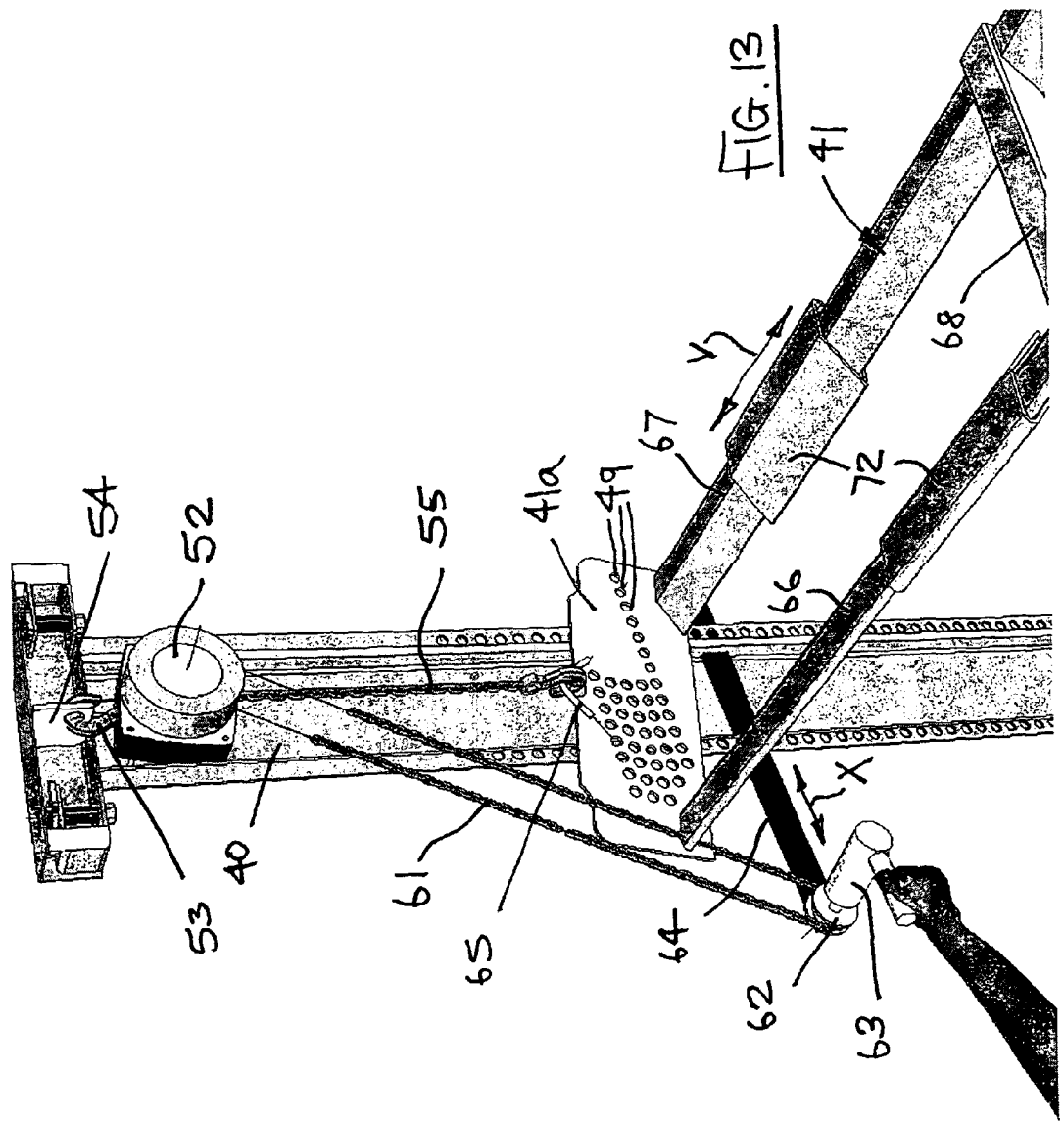
FIG. 13 shows a hoist chain tensioning arrangement used in the present invention.

As best seen in FIG. 13 the hand chain 61 of the hoist 52 engages a chain wheel 62 which can be rotated by a handle, spanner or other convenient manual means (not shown) or can driven, for example, by a hand held electric drill 63. The chain wheel 62 may optionally be supported from a strut 64 carried by the associated post. The effective length of strut 64 relative to post 40, 42 can be adjusted, as indicated by arrow X in FIG. 13, to relieve the operator from needing to apply sufficient force to maintain tension in hand chain 61. This strut adjustment can be done using bolts or pins which pass through holes in the strut and holes in the post. FIG. 13 also shows an alternative fixing of lifting chain 55 to a loop 65 on the associated end plate 41a.

As can be seen best from FIGS. 8 and 13 the front wheel support frame 41 comprises two tapered cross beams 66 and 67 which extend between the end plates 41a and 41b and an intermediate longitudinal brace 68. If necessary, spacers 72 (see FIG. 13) can be slid along beams 66 and 67 as indicated by arrow Y to reduce the spacing between beams 66 and 67 to support smaller diameter wheels.

The rear wheel support frame 43 comprises a single transverse beam 69 and wheel support plates 70 supported from beam 69 via cantilever beams 70a extending from beam 69 and shallow edge beams 70b to maximise the space available to any car below. These wheel support plates 70 can accommodate a wide range of wheel diameters (e.g. typically 450 mm to 750 mm diameter). A gap 71 is provided between cantilevered beams 70a to increase clearance with adjacent car bodies during transportation.

It should be appreciated that the 'front support frame 41' and 'rear support frame 43' relate to the ideal support of typical front and rear wheels of a car. However in practice the operator of the cars can choose to stow the support frames or car in a reversed position so as to put the front wheels nearest the closed end of the container with the support frame positions unchanged. Alternatively he may choose to put the 'front support frame' nearest to the closed end of the container and the 'rear support frame' nearest the door end of the container. Or furthermore, two 'front (or rear) support frames' might be used to support a single car such is the adaptability of the invention to the varying needs of car stowage presented by the wide variations in geometry of cars.

As will also be appreciated, the use of flexible ties 44 which engage the standard fastening hoops 27 secured to the upper and lower side rails 6 and 5 allows the position of the posts 40 and 42 to be adjusted as required along the length of the container since the posts do not require any engagement with the sides of the container other than through the hoops 27 to locate the posts against longitudinal movement. In particular the posts do not engage the corrugations of the side walls of the container for longitudinal location so that this frame system can be used in containers with no rigid sides or containers which are completely open or fitted with flexible side curtains. This ability to adjust the position of the posts along the container, in a manner which is independent of the shape of the sides of the container, gives maximum flexibility in accommodating cars of different sizes.

It is also possible to make small adjustments to the position of the posts even when a car is loaded on the wheel support frames to vary the clearance between the cars in the container. This can be achieved by releasing and tensioning the ties 44 on either side of the posts as required.

As indicated above, each of the posts 40 and 42 can be tied to the side rails 5 and 6 via hoops 27 by four ties 44, two ties at the top and two ties at the bottom. As four posts are used to support each car, if the car weighs 2000 kg, for example, under a rail shunt of say 4 g, this would exert a theoretical force of 8000 kg on the four posts. However, as each post has at least two ties acting in each direction, this gives a total of eight ties to share the 8000 kg force. Thus the force of 1000 kg on the ties and container fastening hoops 27 is well within their strength rating even when a massive 4 g acceleration is experienced. If extra restraint is needed for heavy car loads, then more ties and ratchet devices can be added connected with other fastening hoops 27.

A frame system in accordance with the second form of the present invention to support all four wheels of a vehicle above the floor of a container comprises four posts, front and rear wheel support frames, four hoists (which can be disconnected once the vehicle is secured in its transport position for use with other frame systems), and the necessary ties and bolts etc to secure the posts to the fastening hoops of the container.

It is envisaged that, although posts 40, 42 can be located longitudinally independently of the shape of the sides of the container, the posts might align with and even fit within a valley of a corrugated sidewall of the container. Any difference in the transverse span of the wheel support frames due to the posts entering the sidewall valleys can be accommodated by the provision of wheel support frames of adjustable transverse width. Also, if the posts were to be located in the sidewalls valleys any discrepancy in the longitudinal spacing of the wheel support frames and the wheel positions of the vehicle to be supported can be accommodated by adjusting the longitudinal position of the wheel support frames relative to the posts.

It is an important feature of the present invention that the components of the frame system are individually of low weight and so can be manhandled into position. However a fully assembled and thus heavier assembly can be handled with a fork truck or crane.

It will be appreciated that, if desired, the front and rear wheel support frames 41 and 43 can easily be interchanged on the common posts 40 and 42 so that the cars are carried facing backwards or forwards in the container.

FIG. 9 shows a beam 75 lashed under the front wheel support frame 41 by lashing 76. At the other end beam 75 is hooked at 77 (see FIG. 12) to the rear wheel support frame 43. The purpose of this beam 75 is that, should a car with rear wheel drive and hand brake be loaded, a safe means is needed to prevent the freely rotating front wheels from rotating during the lashing and lifting operation. Hand brakes and gearing associated with the front wheels normally make this beam 75 unnecessary but 20% of cars have freely rotating front wheels. The beam 75 thus ensures that the wheel support frames remain rotationally aligned with the body of the car as the car is raised.

Figure 14:
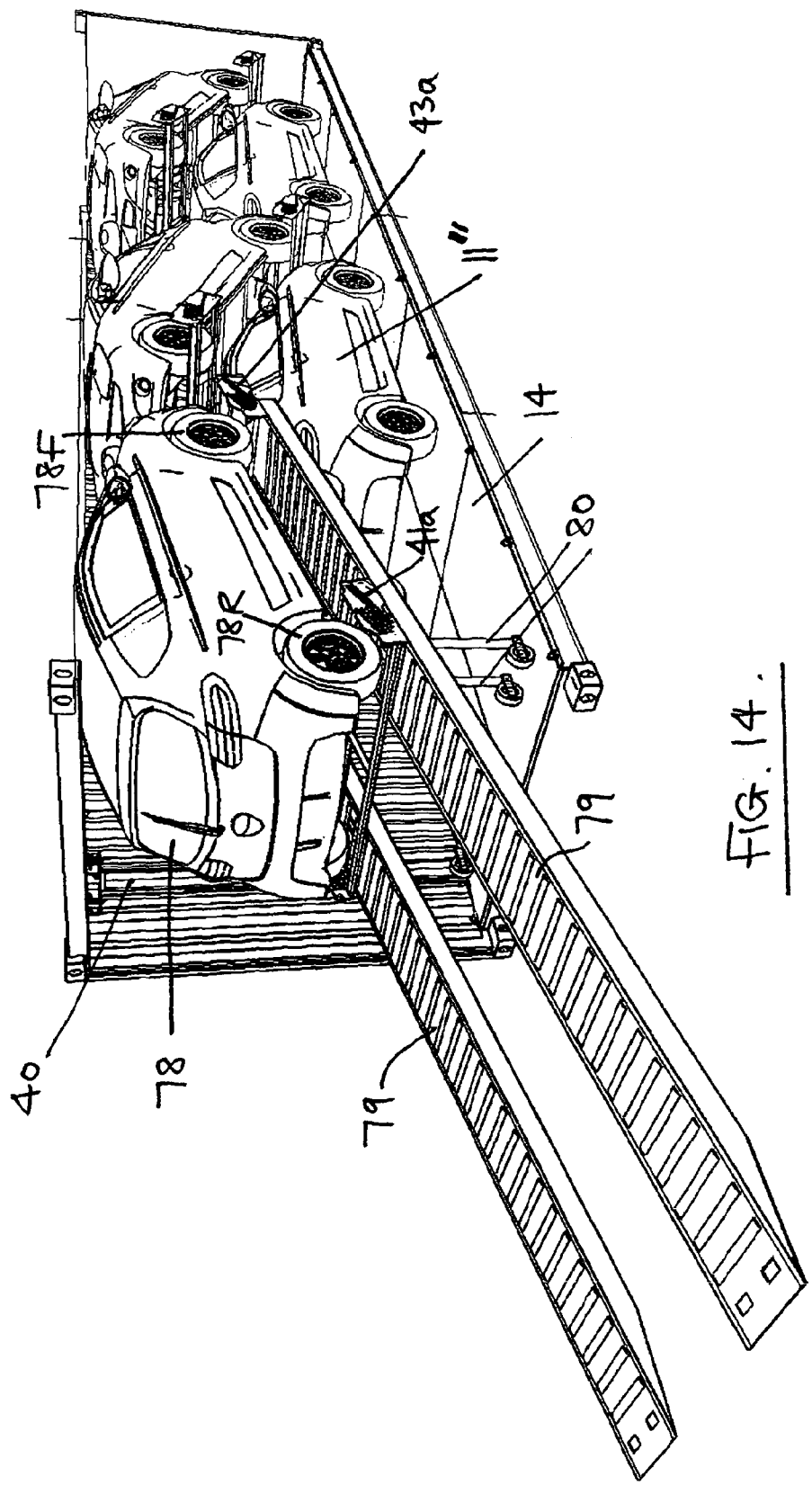
FIG. 14 shows a ramp arrangement used when loading a vehicle onto a frame system in accordance with the present invention.

FIG. 14 shows a means to get a fifth small car 78 up and over the fourth car 11" sited on the floor 14 of the container. In this example there is not enough room to accommodate the small car on the floor behind the fourth car. In this arrangement the same posts 40 and 42 and associated wheel support frames 41 and 43 are fitted at a height above the fourth car. Note that in this arrangement the car front wheels 78F are to be supported by the rear wheel frame 43 on the cantilevered wheel support plates 70. This is important since it will later allow the car to be driven out of engagement with the wheel support frames and down ramps 79. Had it been the other way, the wheels would sink between the two cross members 66 and 67 of the front wheel frame and not easily driven out.

Loading and unloading of a vehicle over a ramp and in or out of wheel frames might require additional motive force which it is envisaged can be provided by a known winch (not shown) used to exert force between vehicle and ramp urging it in or out of a recess in a wheel support frame.

Ramps 79 are then pinned in place underneath the wheel support frames. The assembly is made secure. A car is then driven up the ramps at a slope of typically 12 degrees made possible by the length of the ramps 79. The hoists 52 associated with the wheel support frame 41 are then used to raise the back wheels 78R of the fifth car 78 up and away from contact with the ramps 79. The ramps can then be unpinned from the front wheel frame 43 and removed. Once the ramps are removed, the rear wheels of the car are lowered if necessary so that the rear of the car, by dint of the incline of the car, can be accommodated within the interior of the container and there secured ready for shipping.

The same ramps 79 can also be used to discharge cars from a container on a trailer at a height of typically 1.4 m above the ground. To assist with maneuvering, the ramps can incorporate known trolley jacks to raise the ramps up and down, and further the trolley jacks (e.g. 80) support the mid-span of the ramps 79 prevent excessive deflection of the ramps by the weight of the car during loading or unloading.

Another important aspect of the present invention is the manner in which the components of the system can be stored and transported when not in use.

Figure 15:
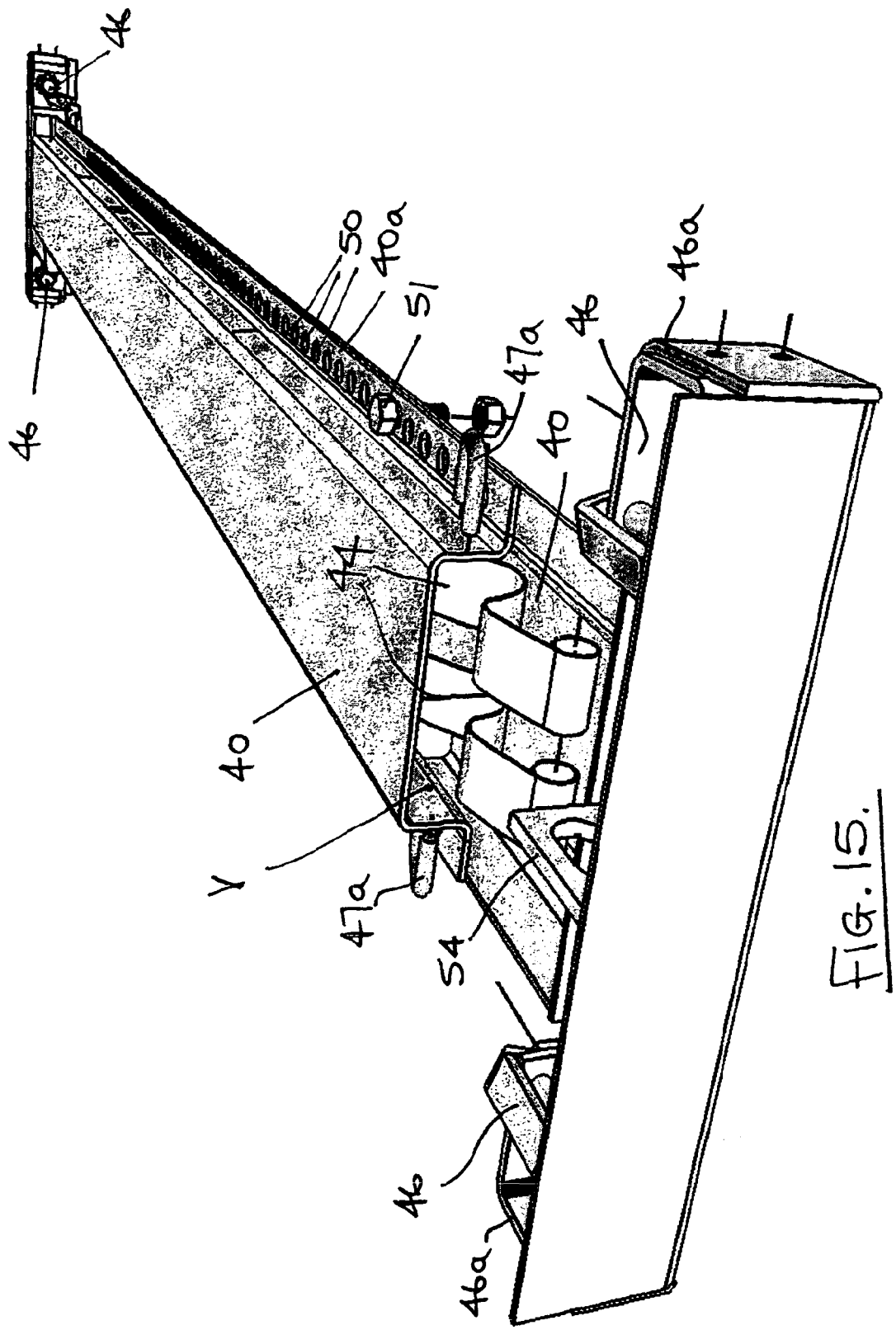
FIG. 15 shows pairing of the support posts used in the present invention when not in use during transit or storage.
Figure 16:
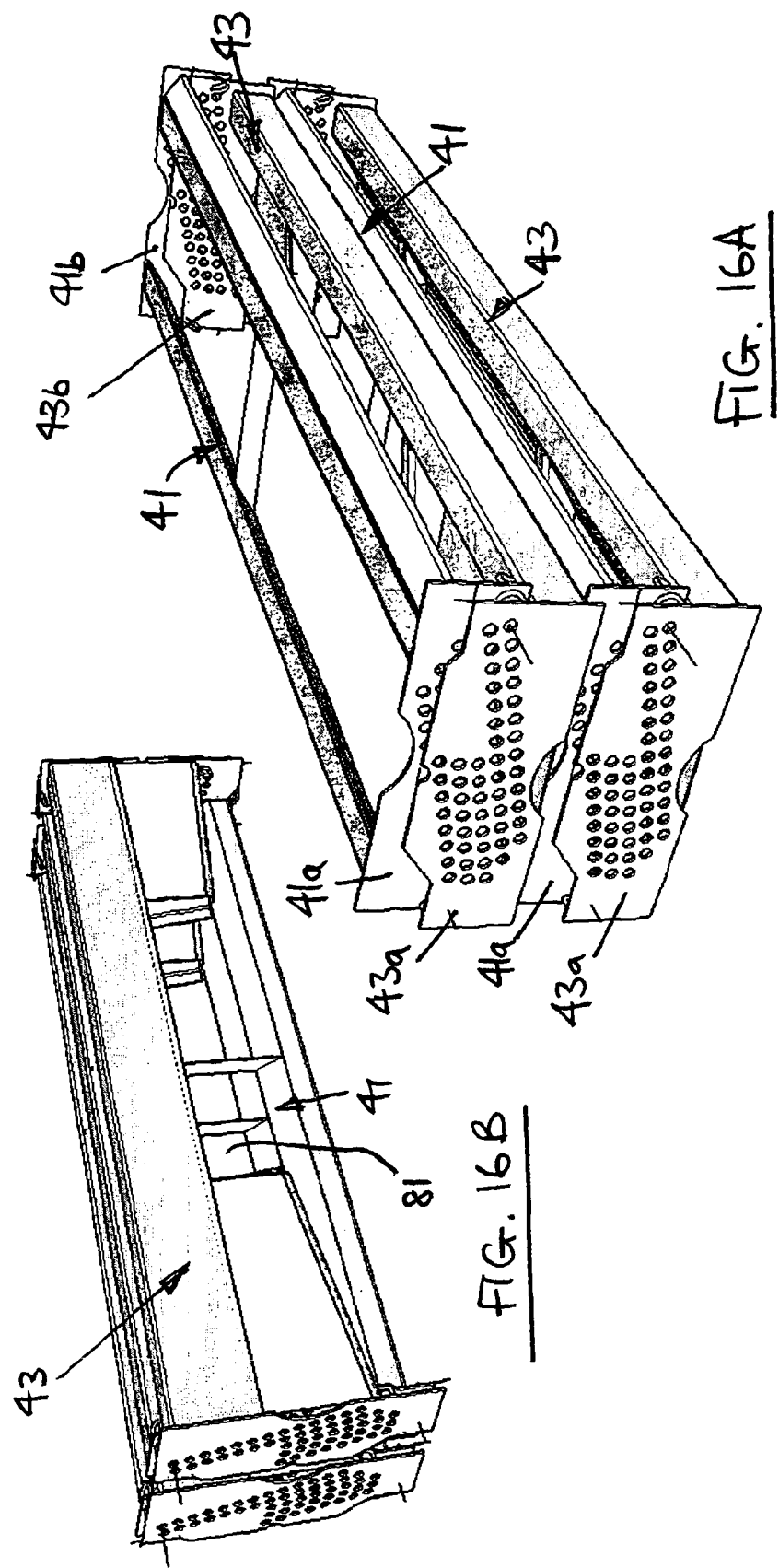
FIGS. 16A and 16B show details of the nesting of wheel support frames during transit or storage.
Figure 17:
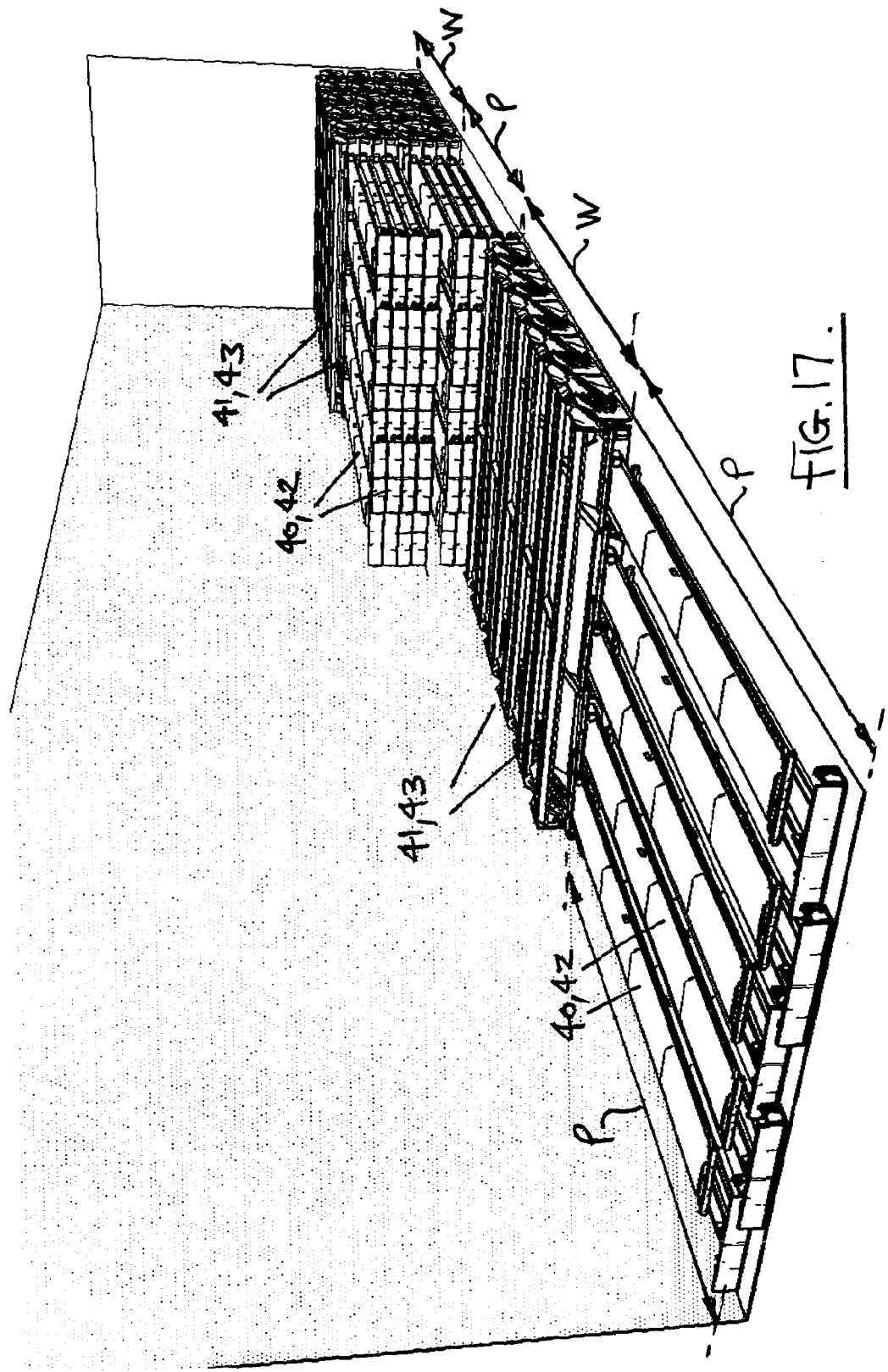
FIG. 17 shows a typical storage and transit arrangement for posts and wheel frames in a standard ISO container.

FIG. 15 shows two posts 40 paired one on top of another in a head to tail configuration. The posts can be bolted together using the same bolts 51 which secure the end plates 41a, 41b and 43a, 43b to the flanges 40a and 42a. The overall length of the post pair can be adjusted to make it easier for the posts to be stowed within a given space of a container as shown in FIG. 17. The volume V within the channel shaped section of the paired posts 40 can be used for the safe storage of the ties 44 and other loose items of the system.

FIGS. 16A and 16B show how two pairs of wheel frames 41, 43 can be stacked together in a compact nested configuration. In FIG. 16A the two pairs are stacked one on top of each other. The transverse beams of the end frames are devised to sit on the end plates and vice versa so that they can be stacked ten high without danger of damage to the frames. The paired frames can be bolted together to form a shipping module or handled separately. The frames can be turned on their side as shown in FIG. 16B and in this position a tunnel 81 is formed under the transverse beams so that ten frames or more can be lifted by a fork lift truck with the tynes of the truck passing thought the tunnel.

FIG. 17 shows the all important stowage of the system. It can be that half the life of the frames is spent in storage and transport back to base so transport is important. It is necessary to be able to open the container and remove just one set of four posts and two wheel frames. So the stowage pattern is important. So too is the number of sets which can be shipped in a given volume to reduce shipping costs. FIG. 17 shows diagrammatically a typical 40 ft container. The internal length of a 40 ft container is 12 m and so can notionally be divided into four equal lengths of 3 m. The posts 40, 42 are extended and paired to make them 3 m long as shown by arrows P in FIG. 17 and the wheel support frames 41, 43 are stacked to form a 3 m long module as shown by arrow W. By pairing the posts at 3 m long a cargo of posts and wheel frames can be laid out in the container so that each layer of frames includes tens sets of frames and the frames do not move about unduly during shipping without need to be lashed down. Wheel frames are shipped transversely; post are shipped longitudinally.

Figure 18A:
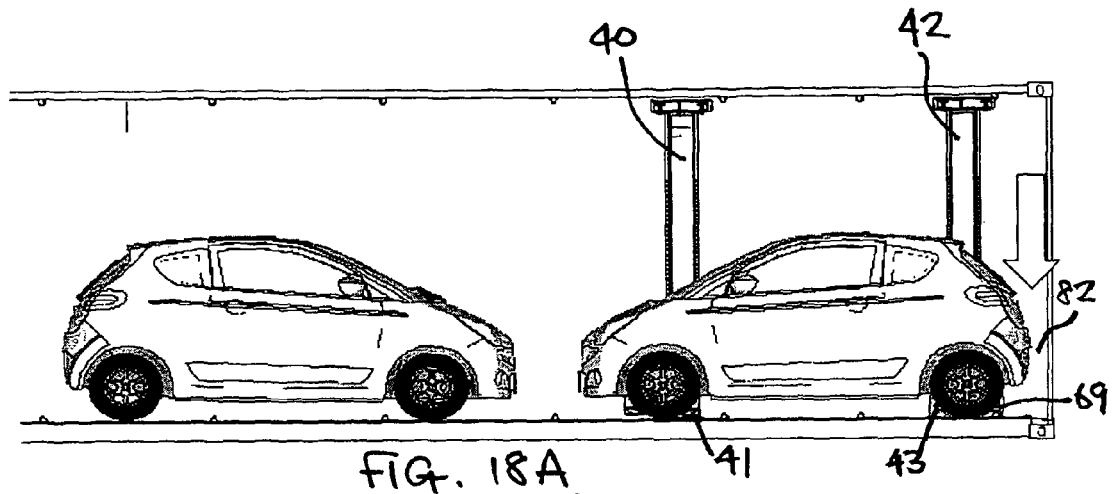
FIGS. 18A to 18C show various stages in the loading and adjustment of the position of a vehicle using the second form of frame system in accordance with the present invention.

FIG. 18A shows the typical loading of vehicles and some of the space problems encountered. In FIG. 18A the post locations are set as best envisaged. The wheel support frames 41, 43 are set on the floor and using the bolts 51 are pinned against slipping whilst the car is driven onto the wheel frames. The car is driven backwards and comes to a stop against the deep transverse beam 69 of the rear wheel support frame 43. Note the space 82 between the back of the car and the container end wall.

Figure 18B:
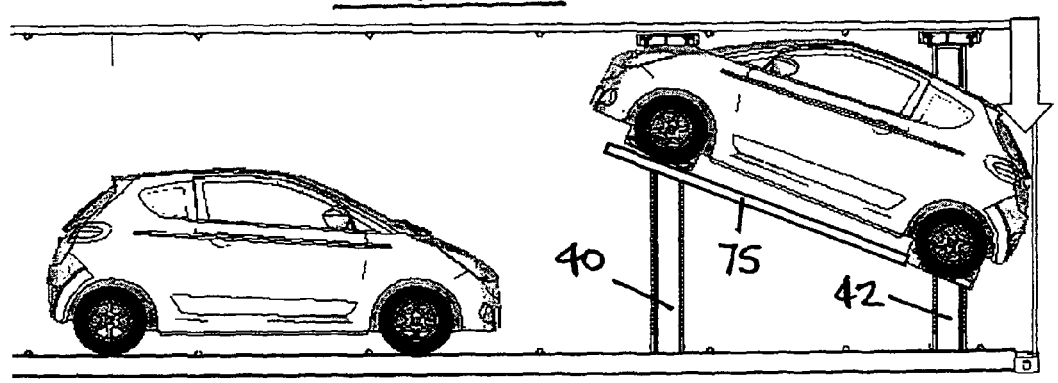
Figure 18C:
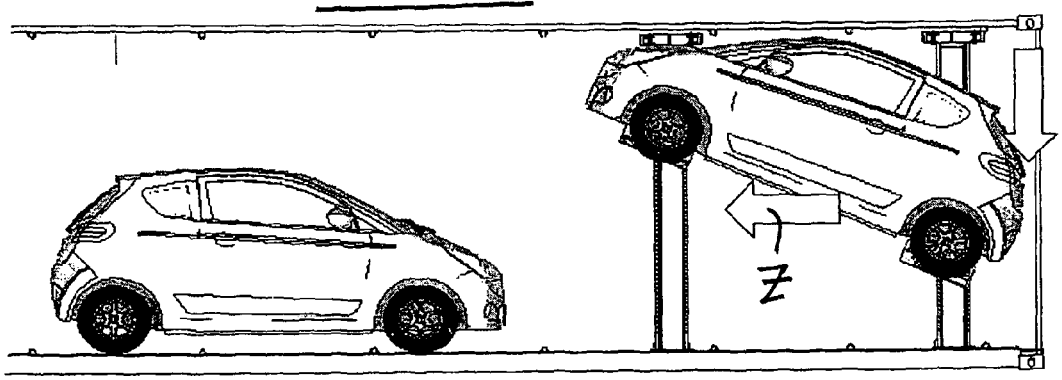

In FIG. 18B as the car is raised and tilted, typically the rotation causes the back of the car to rotate towards the end wall, and often too close for safe transport. Thus it is necessary to move the car away from the wall by displacing the wheel support frame longitudinally relative to the posts (as shown by arrow Z in FIG. 18C) before securing the frames to the posts 40, 42 with bolts 51 for transport. As indicated previously, this longitudinal movement of the car is relatively easy as the car is suspended from vertically extending hoist chains 55.

If required the beam 75 can be used to control free rotation of the wheel frames. Once the bolts have secured the wheel frames to the posts 40, 42, the beam 75, if fitted, can be removed and so can the four hoists for use in raising the next car. This removal of the hoists provides an additional anti-theft device as the car cannot be lowered without the hoists.

A further method of displacing the vehicle away longitudinally from a wall or other vehicle is to slacken and tighten the webbing winches at the top of a pair of posts to displace the top of the post to or from the obstruction displacing the vehicle at the same time.

Figure 19A:
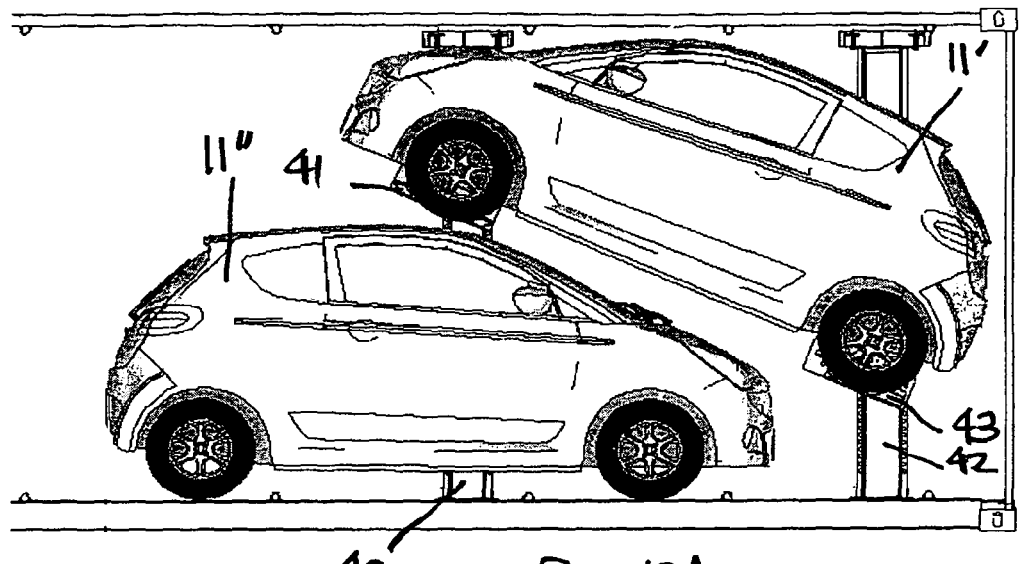
FIGS. 19A and 19B show further positioning movement of vehicles during loading.
Figure 19B:
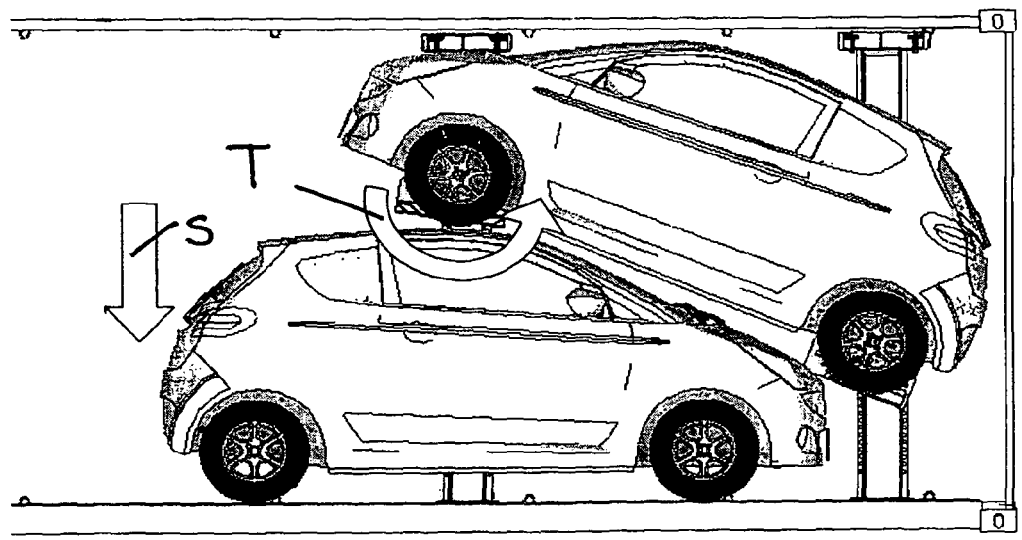

In FIG. 19A, it can be seen that should the front wheel support frame of the top car 11' be too close to the roof of the bottom car 11", thus preventing the bottom car penetrating fully into the container, the wheel support frame 41 can be rotated (see arrow T in FIG. 19B) in this example anticlockwise by judicious manipulation of the hoist and a single bolt 51 to form a pivot so that extra headroom is formed under the front wheel support frame 41. In this example the bottom car 11" is able to enter the container a full 300 mm more (see arrow S) than might otherwise be possible with competitive designs having fixed orientation of their wheel support frames to the car body line.

The invention claimed is:

1. A frame system for supporting an associated vehicle for transport within an existing transportable structure having longitudinally extending side structures, the frame system comprising a transverse supporting frame supported by two vertical posts located one at each end of the supporting frame, the supporting frame being raiseable with or without a vehicle loaded thereon and once raised being fixable to the posts at a chosen location for transport within the transportable structure, wherein each post is provided with attachment means for securing the top and bottom of the post at any of a plurality of locations along the length of the associated side structure independent of the shape of the side structure, and wherein the attachment means comprises ties of adjustable length which when in use pull the top of each post in the fore and aft direction relative to the side structure to locate each post.

2. A frame system according to claim 1 in which, when in use, the ties also pull each post towards the adjacent side of the structure.

3. A frame system according to claim 2 in which each tie is flexible and ratchet winch means are associated with each post for tensioning the flexible tension ties.

4. A frame system according to claim 3 in which each flexible tie passes through or around a guide member on the associated post which, when in use, is spaced from the adjacent side of the structure to provide a pull force towards the adjacent side.

5. A frame system according to claim 1 in which the ties are rigid ties.

6. A frame system according to claim 5 in which the ties are adjustable turnbuckles.

7. A frame system according to claim 1 in which, when in use, each vertical post is attached by ties at both the top and bottom.

8. A frame system according to claim 1 in which, when in use, the bottom of each vertical post is provided with a fixing plate from which fixings attach the bottom of the post to a floor of the transportable structure.

9. A frame system according to claim 1 in which the supporting frame is adjustable relative to each vertical post for rotation about a generally transverse axis when in its transporting position.

10. A frame system according to claim 9 in which each end of the supporting frame is provided with an end plate which slides up and down an inwardly facing surface on the adjacent vertical posts as it is raised and lowered, the end plates include a fastening means by which the frame can be fastened against rotation, vertical displacement and horizontal displacement relative to the posts.

11. A frame system according to claim 10 in which the end plates can slide horizontally relative to the posts.

12. A frame system according to claim 1 in which a hoist is mounted within a recess in the top of each post and the associated support frame is suspended from the hoist by a lift chain or wire which hangs down substantially vertically from the hoist so that the lift chains or wires hang close to the neutral axis of the post section to reduce bending inwards of the post during lifting of the support frame.

13. A frame system according to claim 12 in which the hoist is a manual chain hoist with its hand chain moved by a chain wheel driven by a hand held electric drill.

14. A frame system according to claim 13 in which the chain wheel of each hoist is supported from an arm carried by the associated post.

15. A frame according to claim 14 in which the effective length of the arm is adjustable to enable the chain tension of the chain hoist to be maintained.

16. A frame system according to claim 1 in which ramps can be attached to the support frame for loading a vehicle onto the support frame in a raised position.

17. A frame system according to claim 16 in which the ramps are pinned to the forward positioned support frame and are located underneath the rearmost support frame, the rear most frame resting upon the ramp during vehicle loading, the rear most frame then being liftable clear of the ramp, optionally and temporarily taking part of the vehicle outside of the transportable structure, taking the associated vehicle wheels up with it to allow the now unladen ramp to be disconnected from the forward positioned support frame and removed from the transportable structure.

18. A frame system according to claim 1 in which the vertical posts are channel-shaped and can be paired up and coupled together to form a secure box for the transport of loose fittings when not in use.

19. A frame system according to claim 1 in which the support frame comprises a wheel support plate cantilevered towards the body of the vehicle from a transverse beam, the plate being of a size sufficient to support the locus of the foot print of a wheel of a vehicle to be carried on the support frame.

20. A frame system according to claim 1 which employs four posts and two associated support frames to support the front and rear of a raised vehicle within the transportable structure.

21. A frame system according to claim 20 in which during vehicle lifting the two support frames are not directly connected to each other.

22. A frame system according to claim 21 in which involuntary rotation of one or both of the supporting frames about a transverse axle is restrained by a removable beam attached between the two support frames.

23. A frame system according to claim 20 in which the angle of tilt of the support frames can be adjusted relative to the longitudinal axis of the body of a supported vehicle to increase clearance between the support frame and the body or clearance between the support frame and a vehicle below.

24. A frame system for supporting an associated vehicle for transport within an existing transportable structure having longitudinally extending side structures, the frame system comprising a transverse supporting frame supported by two vertical posts independently moveable from one another located one at each end of the supporting frame, the supporting frame being raiseable relative to the posts and once raised being adjustable relative to the posts, wherein each end of the supporting frame is provided with an end plate which slides up and down an inwardly facing surface on the adjacent vertical posts as it is raised and lowered, the end plates include a fastening means by which the frame can be fastened against rotation, vertical displacement and horizontal displacement relative to the posts.

25. A frame system according to claim 24 in which the end plates each including an array of bolt holes which can be aligned with bolt holes in the cooperating inwardly facing surface on the adjacent vertical post so that the frame can be fastened in a chosen position by inserting bolts through the aligned holes.

26. A frame system according to claim 25 in which, when in use, the support frame is pinned to its associated vertical post by a single bolt, the support frame being rotatable relative to the posts by raising or lowering the support frame so that the frame is rotated about the single bolt to adjust clearance between the support frame and a vehicle below the support frame, another bolt being insertable through aligned bolt holes in each end plate and the associated post when the desired rotational position of the support frame has been obtained.

27. A frame system for supporting an associated vehicle for transport within an existing transportable structure having longitudinally extending side structures, the frame system comprising a transverse supporting frame supported by two vertical posts independently moveable from one another located one at each end of the supporting frame, the supporting frame being raiseable with or without a vehicle loaded thereon and once raised being fixable to the posts at a chosen location for transport within the transportable structure, wherein each post is provided with attachment means for securing the top and bottom of the post at any of a plurality of locations along the length of the associated side structure independent of the shape of the side structure and wherein the attachment means comprises a pin with a hooked end, the pin being insertable through a selected one of a series of holes connected with the post and the hooked end of the pin being engageable with standard fastening hoops attached to top and/or bottom side rails of the container.

28. A frame system according to claim 27 in which each post has a generally longitudinally extending support rail connected therewith in which the series of holes are formed.

29. A frame system according to claim 28 in which each post and associated support rail are braced by diagonal stays to form a triangular structure for the support of each end of the support frame.

30. A frame system according to claim 28 in which, when in use, the support rails are located adjacent the bottom side rails of the transportable structure with the hooked pins engaging the fastening hops associated with the bottom side rails.

31. A frame system according to claim 28 in which, when in use, the support rails are located adjacent the top side rails of the transportable structure with the hooked pins engaging the fastening hoops associated with the top side rails and the other ends of the post resting on a floor of the container.

* * * * *